US012525258B1

(12) United States Patent
Masterson et al.

(10) Patent No.: US 12,525,258 B1
(45) Date of Patent: Jan. 13, 2026

(54) METHOD FOR MAKING A MAGNETIC RECORDING HEAD WITH A PIEZOELECTRIC ACTUATOR FOR CONTROLLING HEAD-MEDIA SPACING

(71) Applicant: Seagate Technology LLC, Fremont, CA (US)

(72) Inventors: Glen Cornelius Masterson, Londonderry (GB); Jennifer Carville, Portstewart (GB); Paula Frances McElhinney, Londonderry (GB)

(73) Assignee: Seagate Technology LLC, Fremont, CA (US)

( * ) Notice: Subject to any disclaimer, the term of this patent is extended or adjusted under 35 U.S.C. 154(b) by 400 days.

(21) Appl. No.: 18/330,970

(22) Filed: Jun. 7, 2023

Related U.S. Application Data

(60) Provisional application No. 63/367,338, filed on Jun. 30, 2022.

(51) Int. Cl.
| | |
|---|---|
| *G11B 5/60* | (2006.01) |
| *G11B 5/31* | (2006.01) |
| *H10N 30/02* | (2023.01) |
| *H10N 30/03* | (2023.01) |
| *H10N 30/05* | (2023.01) |

(Continued)

(52) U.S. Cl.
CPC .......... *G11B 5/6058* (2013.01); *G11B 5/3163* (2013.01); *H10N 30/02* (2023.02); *H10N 30/03* (2023.02); *H10N 30/05* (2023.02); *H10N 30/074* (2023.02); *H10N 30/082* (2023.02)

(58) Field of Classification Search
CPC ..... G11B 5/6058; G11B 5/3163; G11B 21/00; G11B 21/025; G11B 21/043; G11B 21/106; H10N 30/02; H10N 30/03; H10N 30/05; H10N 30/074; H10N 30/082
See application file for complete search history.

(56) References Cited

U.S. PATENT DOCUMENTS

| | | |
|---|---|---|
| 5,473,486 A | 12/1995 | Nepela et al. |
| 5,943,189 A | 8/1999 | Boutaghou et al. |
| 6,487,045 B1 | 11/2002 | Yanagisawa |

(Continued)

FOREIGN PATENT DOCUMENTS

| | | | |
|---|---|---|---|
| JP | 2000348321 A | 12/2000 | |
| JP | 2009259376 A | 11/2009 | |
| WO | WO-2021224284 A1 * | 11/2021 | ......... B81C 1/00341 |

OTHER PUBLICATIONS

Juang, et al., "Controlled-flying proximity sliders for head-media spacing variation suppression in ultralow flying air bearings," in IEEE Transactions on Magnetics, vol. 41, No. 10, Oct. 2005, pp. 3052-3054, doi: 10.1109/TMAG.2005.855255.

(Continued)

*Primary Examiner* — Sardis F Azongha
(74) *Attorney, Agent, or Firm* — Mueting Raasch Group

(57) ABSTRACT

A magnetic recording head includes a piezoelectric actuator for controlling head-media spacing. A method for making the magnetic recording head including a piezoelectric actuator includes the steps of: providing a source wafer on which to fabricate the piezoelectric actuator; providing a target wafer; fabricating the piezoelectric actuator on the source wafer; releasing the piezoelectric actuator from the source wafer; and placing the piezoelectric actuator on the target wafer.

20 Claims, 18 Drawing Sheets

(51) Int. Cl.
*H10N 30/074* (2023.01)
*H10N 30/082* (2023.01)

(56) References Cited

U.S. PATENT DOCUMENTS

| | | | |
|---|---|---|---|
| 6,570,730 | B1 | 5/2003 | Lewis et al. |
| 7,369,347 | B2 | 5/2008 | Lee |
| 7,388,726 | B1 | 6/2008 | McKenzie et al. |
| 7,773,346 | B1 | 8/2010 | Guo et al. |
| 7,835,115 | B2 | 11/2010 | Meyer |
| 8,593,749 | B2 | 11/2013 | Atsumi et al. |
| 8,804,275 | B1 | 8/2014 | Mate |
| 8,837,075 | B2 | 9/2014 | Hanchi et al. |
| 8,867,323 | B2 | 10/2014 | Andruet et al. |
| 9,202,497 | B2 | 12/2015 | Rea et al. |
| 10,311,905 | B1 | 6/2019 | Guo et al. |
| 2002/0071215 | A1 | 6/2002 | Lewis et al. |
| 2002/0191342 | A1 | 12/2002 | Yanagisawa |
| 2003/0095361 | A1 | 5/2003 | Shimanouchi et al. |
| 2005/0088784 | A1 | 4/2005 | Macken et al. |
| 2008/0158713 | A1 | 7/2008 | Bhatia et al. |
| 2009/0080119 | A1 | 3/2009 | Kurihara et al. |
| 2009/0219653 | A1 | 9/2009 | Aoki et al. |
| 2009/0237841 | A1 | 9/2009 | Kurihara et al. |
| 2009/0296264 | A1 | 12/2009 | Meyer |
| 2010/0073823 | A1 | 3/2010 | Aoki et al. |
| 2013/0170072 | A1 | 7/2013 | Meyer |
| 2021/0002128 | A1* | 1/2021 | Cok ............ H10N 30/02 |
| 2023/0336150 | A1* | 10/2023 | Trindade ............ H03H 9/0504 |

OTHER PUBLICATIONS

Schatz, et al., "Pulsed laser deposition of piezoelectric lead zirconate titanate thin films maintaining a post-CMOS compatible thermal budget," Journal of Applied Physics Sep. 21, 2017; 122 (11): 114502. https://doi.org/10.1063/1.5000367, 9 pp.

Wang, et al., "A one-step residue-free wet etching process of ceramic PZT forpiezoelectric transducers," Sensors and Actuators A 290, Mar. 2019, pp. 130-136.

Kosec, et al., "Chemical solution deposition of PZT thin films for microelectronics," Materials Science in Semiconductor Processing, vol. 5, Issues 2-3, Apr.-Jun. 2002, pp. 97-103.

Ambika, et al., "Deposition of PZT thin films with {001}, {110}, and {111} crystallographic orientations and their transverse piezoelectric characteristics," Adv. Mat. Lett. Apr. 2012, 3(2), pp. 102-106.

Schroth, et al., "Application of sol-gel deposited thin PZT film for actuation of 1D and 2D scanners," Proceedings MEMS 98. IEEE. Eleventh Annual International Workshop on Micro Electro Mechanical Systems. An Investigation of Micro Structures, Sensors, Actuators, Machines and Systems (Cat. No. 98CH36176, Heidelberg, Germany, Jan. 25-29, 1998, pp. 402-407, doi: 10.1109/MEMSYS.1998.659790.

Zheng, et al., "Study on wet-etching of PZT thin film," Digest of Papers Microprocesses and Nanotechnology 2003. 2003 International Microprocesses and Nanotechnology Conference, Tokyo, Japan, Oct. 29-31, 2003, pp. 248-249, doi: 10.1109/IMNC.2003.1268739.

Bower, et al., "Transfer printing: An approach for massively parallel assembly of microscale devices, " 2008 58th Electronic Components and Technology Conference, Lake Buena Vista, FL, USA, May 27-30, 2008, pp. 1105-1109, doi: 10.1109/ECTC.2008.4550113.

* cited by examiner

METHOD FOR MAKING A MAGNETIC RECORDING HEAD WITH A PIEZOELECTRIC ACTUATOR FOR CONTROLLING HEAD-MEDIA SPACING

This application claims priority to U.S. Provisional Patent Application Ser. No. 63/367,338, entitled "A METHOD FOR MAKING A MAGNETIC RECORDING HEAD WITH A PIEZOELECTRIC ACTUATOR FOR CONTROLLING HEAD-MEDIA SPACING" and filed Jun. 30, 2022, the entire contents of which are hereby incorporated by reference.

TECHNICAL FIELD

The disclosure relates to a magnetic recording head for data storage.

BACKGROUND

A magnetic recording head of a hard disk drive (HDD) includes at least one active component. In some examples, an active component is a writer that is configured to produce a magnetic field and direct the magnetic field toward a surface of a magnetic disk to orient the magnetization of grains of the magnetic disk and produce bits of written data. In some examples, an active component is a reader that is configured to respond to magnetic fields from written bits of data on a surface of a magnetic disk and send signals representing the written data to electronics of the HDD to be decoded. In the example of a heat-assisted magnetic recording (HAMR) head, an active component may be a near-field transducer that is configured to direct optical energy toward a surface of a magnetic disk to lower the magnetic coercivity of grains of the magnetic disk and enable a writer to orient the magnetization of the grains to produce bits of written data.

The ability of a magnetic recording head to write and read data to and from a magnetic disk, respectively, is in part determined by the distance between the magnetic recording head and the magnetic disk. This dimension is referred to as the head-media spacing (HMS). More specifically, an HMS may be defined as a distance between an active component of a magnetic recording head and a magnetic disk (e.g., writer HMS, reader HMS). In the case of writer HMS, a closer (e.g., lower) HMS may enable bits of data to be written smaller and with sharper, more defined transitions, potentially increasing the amount data that can be written on the magnetic disk (known as the areal density capability, or ADC). In the case of reader HMS, a closer HMS may enable the reader to receive a stronger magnetic field, and thus a stronger signal, from the written bits of data. A stronger read signal may contribute to a higher signal-to-noise ratio (SNR) of the magnetic recording head, a metric that quantifies the ability of the magnetic head to resolve data with fewer errors. A higher SNR may also enable smaller bits to be written, potentially enabling higher ADC. However, while a close HMS may enable improved write and/or read capability of a magnetic recording, there is also a risk of mechanical damage to the magnetic recording head in the event of physical contact with the magnetic disk. Thus, the ability to minimize and consistently control the HMS of a component is a desired feature of a magnetic recording head.

SUMMARY

The present disclosure describes a method for making a magnetic recording head having a piezoelectric actuator. The piezoelectric actuator is configured to displace one or more active components of the magnetic recording head in a manner that changes the head-media spacing (HMS) between an active component and a proximal magnetic disk. Utilizing a piezoelectric actuator to control HMS may enable improvements related to capacity, speed, and/or reliability of an HDD (e.g., from writing smaller, more defined bits, enabling higher areal density capability (ADC); from providing higher signal-to-noise ratio and/or lower bit-error rate while reading bits). Additionally, a piezoelectric actuator may operate at a lower temperature than other means of HMS control (e.g., a heater) and may reduce thermal stress on the magnetic recording head, potentially improving reliability and/or extending the lifetime of the magnetic recording head. Finally, a piezoelectric actuator may consume less power than other means of HMS control, potentially reducing the power consumption of an HDD.

A method for making a magnetic recording head having a piezoelectric actuator includes fabricating a piezoelectric actuator on a source wafer and transferring the piezoelectric actuator to a target wafer. The target wafer is a wafer that is configured for fabrication of the magnetic recording head. That is, the target wafer may include some features of a magnetic recording head, and further processing and completion of the magnetic recording head may be completed after the piezoelectric actuator is transferred from the source wafer to target wafer. Fabricating a piezoelectric actuator on a source wafer and transferring the piezoelectric actuator to a target wafer for integration into the magnetic recording head may provide flexibility in the materials and/or processing conditions that are used to fabricate the piezoelectric actuator. For example, fabricating the piezoelectric actuator on a source wafer may enable the use of high temperature processes (e.g., the deposition of a piezoelectric layer) that exceed a temperature that may be withstood by components of the magnetic recording head that have already been fabricated on the target wafer (e.g., a reader stack).

In one example, a method for making a magnetic recording head including a piezoelectric actuator for controlling head-media spacing includes the steps of: providing a source wafer on which to fabricate the piezoelectric actuator; providing a target wafer; fabricating the piezoelectric actuator on the source wafer; releasing the piezoelectric actuator from the source wafer; and placing the piezoelectric actuator on the target wafer.

In another example, a method for making a magnetic recording head including a piezoelectric actuator for controlling head-media spacing includes the steps of: providing a source wafer on which to fabricate the piezoelectric actuator; providing a sacrificial layer on the source wafer; providing a target wafer; fabricating the piezoelectric actuator on the source wafer; depositing a tether layer on the piezoelectric actuator; patterning tethers in the tether layer, the tethers configured to bind the piezoelectric actuator to the source wafer after removing the sacrificial layer; removing the sacrificial layer with an etch process such that a gap remains between the piezoelectric actuator and the source wafer, and the piezoelectric actuator is bound to the source wafer by the tethers; contacting a surface of the tether layer with a stamp such that the tether layer becomes coupled to the stamp; applying a force to the stamp such that the tethers are broken and the piezoelectric actuator is lifted from the source wafer; and placing the piezoelectric actuator on the target wafer.

In another example, a method for making a magnetic recording head including a piezoelectric actuator for controlling head-media spacing includes the steps of: providing a source wafer on which to fabricate the piezoelectric actuator; providing a target wafer; providing a sacrificial layer on the source wafer; depositing one or more piezoelectric layers and one or more electrodes on the source wafer; patterning the one or more piezoelectric layers to segregate and define the piezoelectric actuator; releasing the piezoelectric actuator from the source wafer; and placing the piezoelectric actuator on the target wafer.

These and other features and aspects of various examples may be understood in view of the following detailed discussion and accompanying drawings.

DETAILED DESCRIPTION

Figure 1:
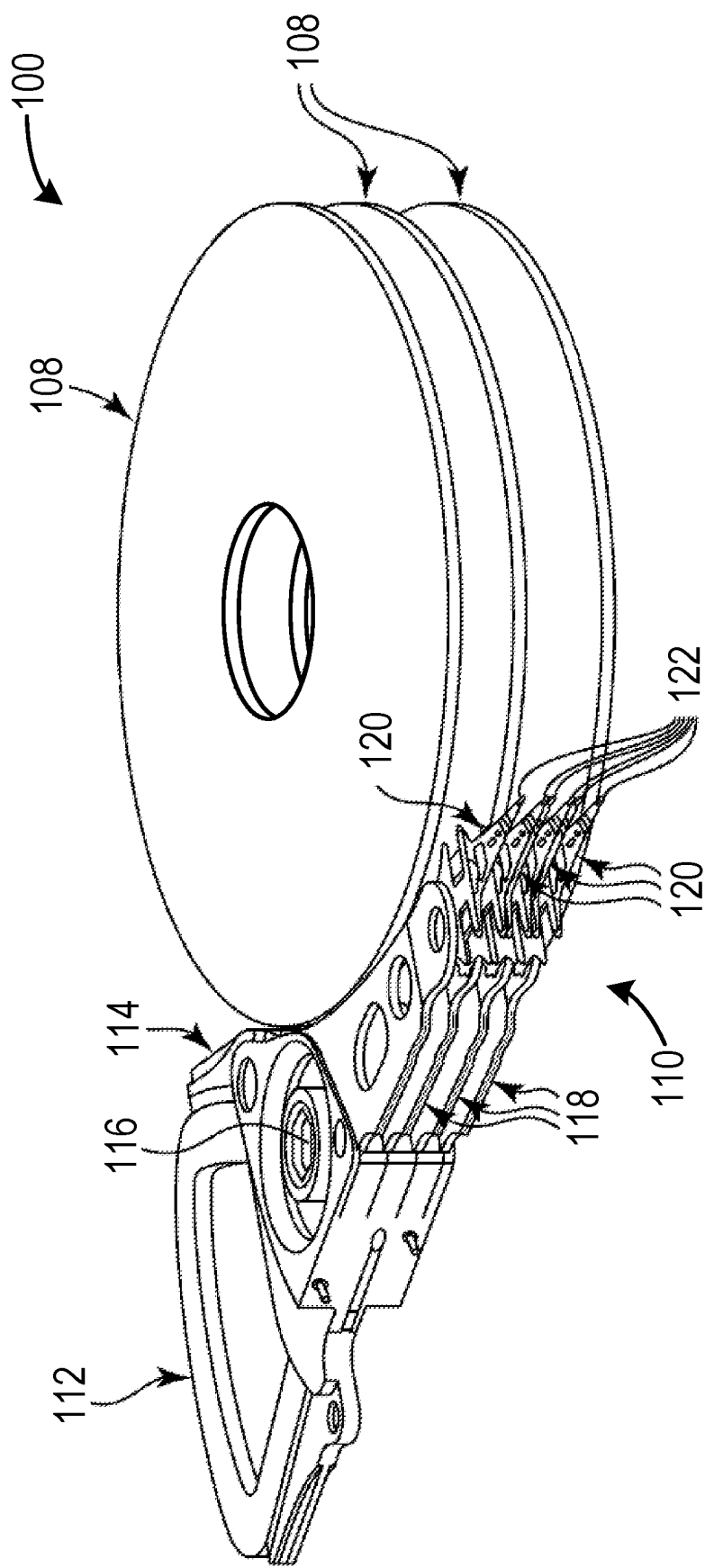
FIG. 1 is a perspective view of an example hard disk drive, in accordance with aspects of this disclosure.

FIG. 1 is a perspective view of an example heat-assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
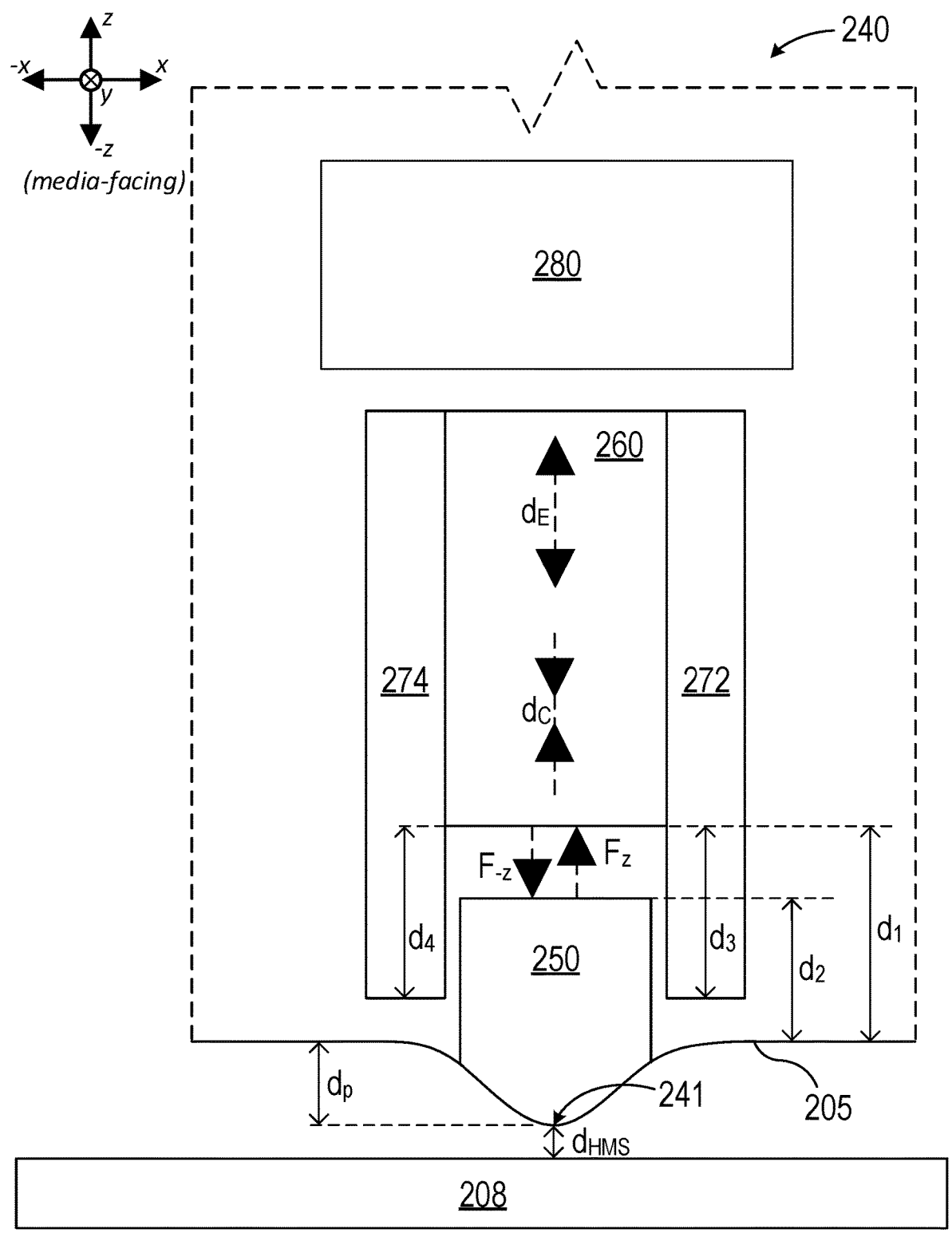
FIG. 2 is a cross-sectional view of an example magnetic recording head, in accordance with aspects of this disclosure.

FIG. 2 is a cross-sectional view of an example magnetic recording head, in accordance with aspects of this disclosure. Magnetic recording head 240 may be a magnetic recording head of HDD 100 of FIG. 1. Magnetic recording head 240 includes an active component 250 and a piezoelectric actuator 260. In the example of FIG. 2, magnetic recording head 240 includes compliant layers 272 and 274, and a blocking beam 280.

In some examples, active component 250 is a writer that is configured to generate a magnetic field from an electrical current and direct the magnetic field toward magnetic disk 208 to write bits of data on magnetic disk 208. In some examples, active component 250 is a reader that is configured to respond to magnetic fields from written bits of data on magnetic disk 208 and direct signals representing the bits of data to electronics of the HDD for decoding (e.g., a preamp, a channel). In some examples, active component 250 may be a feature associated with heat-assisted magnetic recording (HAMR), such as a near-field transducer (NFT) that is configured to direct energy toward magnetic disk 208 and reduce the magnetic coercivity of a portion of magnetic disk 208, thus enabling an associated writer of magnetic recording head 240 to write bits of data on magnetic disk 208.

Active component 250 is disposed proximal to a media-facing surface 205 of magnetic recording head. A feature or features of active component 250 may be presented on media-facing surface 205. Magnetic recording head 240 may be positioned over a surface of a proximal magnetic disk 208 such that a portion of active component 250 (e.g., a write pole of a writer, a tunneling magnetoresistive junction of a reader) is proximal to magnetic disk 208 and is separated from magnetic disk 208 by a head-media spacing (HMS) $d_{HMS}$.

In accordance with aspects of this disclosure, piezoelectric actuator 260 is configured to exert a mechanical force to displace active component 250 such that the displacement changes a protrusion $d_P$ of active component 250 from media-facing surface 205. Changing protrusion $d_P$ may change head-media spacing $d_{HMS}$ between active component 250 and magnetic disk 208. For example, during an HDD cycle (e.g., a write cycle, a read cycle), piezoelectric actuator 260 may exert a force $F_{-z}$ on active component 250 such that at least a portion of active component 250 (e.g., a write pole of a writer, a tunneling magnetoresistive (TMR) junction of a reader) moves in a −z direction toward magnetic disk 208, thus increasing protrusion $d_P$ and decreasing $d_{UMS}$. At the end of an HDD cycle, or, in some examples, during an HDD cycle or in a transition to another, different HDD cycle, piezoelectric actuator 260 may exert a force $F_z$ on active component 250, or relax a prior applied force on active component 250, such that at least a portion of active component 250 moves in a z direction away from magnetic disk 208, thus decreasing protrusion $d_P$ and increasing $d_{HMS}$.

A lower $d_{HMS}$ (i.e., closer spacing between active component 250 and magnetic disk 208) may benefit the performance of magnetic recording head 240 and its associated HDD (e.g., HDD 100 of FIG. 1). For example, a lower $d_{HMS}$ may enable smaller and/or more well-defined bits to be written, potentially enabling higher areal density capability (ADC). In some examples, a lower $d_{HMS}$ may enable improved readability of written bits on magnetic disk 208 (e.g., through higher signal-to-noise ratio (SNR), through lower bit-error rate (BER)). However, a lower $d_{HMS}$ may also increase the risk of undesired contact between magnetic recording head 240 and magnetic disk 208 and may result in mechanical damage to magnetic recording head 240. Utilizing piezoelectric actuator 260 to control HMS (e.g., $d_{UMS}$) may provide less variation, and thus higher accuracy, in targeting $d_{HMS}$ when compared with other means of displacing an active component of a magnetic recording head (e.g., a heater). Such improved control over $d_{HMS}$ variation and accuracy may enable a lower $d_{UMS}$ to be targeted while reducing risk of mechanical damage to magnetic recording head 240 and its respective components and features.

In some examples, reduced variation in $d_{HMS}$ when utilizing piezoelectric actuator 260 may result from a lower operating temperature of piezoelectric actuator 260. That is, excess heat from some means of controlling $d_{UMS}$ (e.g., a heater) may produce undesired expansion of material in the vicinity of an active component, causing variation in protrusion $d_P$ and thus in $d_{UMS}$. In contrast, utilizing piezoelectric actuator 260, which produces minimal additional heat, may result in a lower overall operating temperature of magnetic recording head 240 and less undesired thermally-induced expansion and variation in protrusion $d_P$, providing a more consistent $d_{UMS}$. In some examples, piezoelectric actuator 260 may consume less power to produce a displacement of active component 250 when compared with other means of displacing an active component. The lower power consumption required to displace active component 250 by protrusion $d_P$ may reduce the overall power consumed by an HDD (e.g., HDD 100 of FIG. 1).

In some examples, a portion of active component 250 that protrudes from media-facing surface 205 becomes the point of magnetic recording head 240 that is closest to magnetic disk 208, that is, a close point 241 of magnetic recording head 240, and $d_{UMS}$ may be the distance between close point 241 and magnetic disk 208. Placing close point 241 closer to a specific feature (e.g., a write pole, a TMR junction) may provide improved performance of the respective component. Piezoelectric actuator 260 may enable close point 241 to be controlled more accurately than other means of displacing active component 250. For example, piezoelectric actuator 260 may improve control of the location of protrusion $d_P$ along media-facing surface 205 in the x-dimension, control of the shape and/or width of protrusion $d_P$, and/or control of the position of close point 241 along protrusion $d_P$. Controlling the shape and/or position of protrusion $d_P$ and/or close point 241 may, in some examples, enable better read and/or write performance of magnetic recording head 240.

In the example of recording head 240 of FIG. 2, piezoelectric actuator 260 is adjacent to active component 250. In this example, "adjacent" may include a separation between piezoelectric actuator 260 and active component 250, where the separation includes a material. For example, the separation between piezoelectric actuator 260 and active component 250 may include a dielectric material having a high modulus of elasticity (e.g., aluminum oxide, silicon carbide, tungsten carbide). Piezoelectric actuator 260 is a distance $d_1$ from media-facing surface 205 that is greater than a distance $d_2$ between a rear edge of active component 250 and media-facing surface 205. A part of piezoelectric actuator 260 is disposed behind active component 250 relative to media-facing surface 205 (in the z direction of FIG. 2). Positioning piezoelectric actuator 260 adjacent to and/or behind active component 250 may enable piezoelectric actuator 260 to exert forces $F_{-z}$ and/or $F_z$ on active component 250. A layer, or layers, of piezoelectric actuator 260 may, for example, expand or contract in response to receiving a signal (e.g., a voltage). An expansion $d_E$ or contraction $d_C$ of piezoelectric actuator may produce expansion or contraction forces, respectively, in volumes surrounding piezoelectric actuator 260. Expansion $d_E$ of piezoelectric actuator 260, for example, may exert force $F_{-z}$ on active component 250. Contraction $d_C$ of piezoelectric actuator 260 may exert force $F_z$ on active component 250. The magnitude of expansion $d_E$ or contraction $d_C$ of piezoelectric actuator 260, and thus the magnitudes of forces $F_{-z}$ and $F_z$, respectively, may be defined by the signal received by piezoelectric actuator 260, for example by a change in a voltage applied to piezoelectric actuator 260, and may define the change in displacement and protrusion $d_P$ of active component 250. That is, by controlling a signal that is directed to piezoelectric actuator 260 (e.g., a voltage), the magnitude of protrusion $d_P$ and the resultant $d_{UMS}$ may be controlled. In contrast to other means of controlling displacement and head-media spacing of an active component of a magnetic recording head, applying a voltage to a piezoelectric actuator (e.g., across a layer of piezoelectric material of the piezoelectric actuator) may enable finer and/or more consistent control of protrusion $d_P$ and thus $d_{HMS}$.

Compliant layers 272 and 274 are each coupled to a surface of piezoelectric actuator 260. Compliant layers 272 and 274 each extend substantially orthogonal to and toward the media-facing surface 205. In one example, portions of compliant layers 272 and 274 are adjacent to active component 250. Compliant layers 272 and 274 may each include a mechanically compliant dielectric material such as polyimide. Compliant layers 272 and 274 are each configured to increase the efficiency of displacement of active component 250 for a given expansion $d_E$ or contraction $d_C$ of piezoelectric actuator 260. For example, compliant layers 272 and 274 may increase the magnitude of a change in protrusion $d_P$ for a given expansion $d_E$, which itself may be determined by a voltage applied to a layer of piezoelectric actuator 260. The term "stroke efficiency" may be used to quantify this efficiency metric (e.g., nanometers of protrusion per applied volt, or nm/V), and including compliant layers 272 and/or 274 may provide a higher stroke efficiency than a magnetic recording head that does not include one or more compliant layers. Compliant layers 272 and 274 that are longer than piezoelectric actuator 260 in the direction of expansion (e.g., the media-facing-z direction of the example of FIG. 2) may further increase stroke efficiency. For example, compliant layers 272 and 274 extend beyond piezoelectric actuator 260 toward media-facing surface 205 by distances $d_3$ and $d_4$, respectively. Additionally, compliant layers 272 and/or 274 may electrically isolate other components of magnetic recording head 240 from voltages that are applied to piezoelectric actuator 260.

Blocking beam 280 is disposed behind piezoelectric actuator 260, in some embodiments, relative to media-facing surface 205 and may be disposed at a similar position to piezoelectric actuator 260 in the x and y dimensions of FIG. 2. Blocking beam 280 is configured to reduce a voltage that is required to displace active component 250 by a distance (e.g., increase the stroke efficiency) by directing expansion $d_E$ of piezoelectric actuator 260 toward media-facing surface 205. Blocking beam 280 may be or may include a layer or block of material having a high modulus of elasticity (e.g., silicon carbide, sapphire, tungsten, tungsten carbide, graphene). Blocking beam 280 is placed relative to piezoelectric actuator 260 such that expansion $d_E$ of piezoelectric actuator 260 is partially mitigated in the vicinity of blocking beam 280, with resultant forces from expansion $d_E$ directed away from blocking beam 280 and increasing the magnitude of the force directed toward active component 250. This redirection of expansion $d_E$ may increase the magnitude of force $F_{-z}$ that piezoelectric actuator 260 exerts on active component 250 and may increase the stroke efficiency of piezoelectric actuator 260 in displacing active component 250 by a change in protrusion $d_P$.

It should be noted that the blocking beam 280 and compliant layers 272 and/or 274, while useful in increasing stroke efficiency, are in no way required for the successful operation of the piezoelectric actuator 260. Thus, while a particular embodiment of the recording head 240 is illustrated herein, it should be understood that some, in any combination, of the above components may be omitted in any particular substantiation of the recording head 240.

Figure 3:
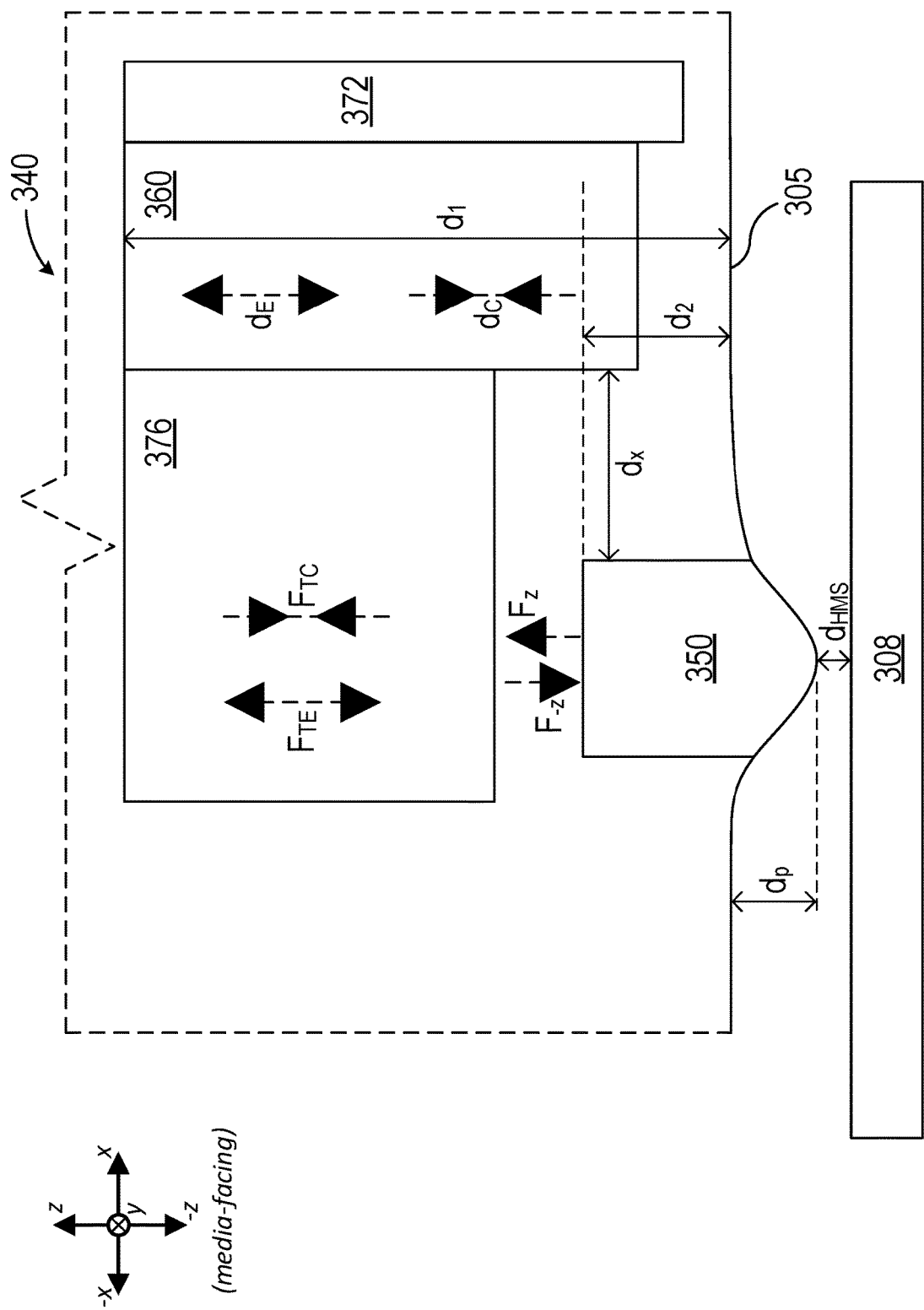
FIG. 3 is a cross-sectional view of an example magnetic recording head, in accordance with aspects of this disclosure.

FIG. 3 is a cross-sectional view of an example magnetic recording head, in accordance with aspects of this disclosure. Magnetic recording head 340 may be a magnetic recording head of HDD 100 of FIG. 1. Magnetic recording head 340 includes an active component 350, a piezoelectric actuator 360, and a mechanical amplification structure 376. In the example of FIG. 3, magnetic recording head 340 includes a compliant layer 372.

Active component 350 is disposed proximal to a media-facing surface 305 of magnetic recording head 340. A feature or features of active component 350 may be presented on media-facing surface 305. Magnetic recording head 340 may be positioned over a surface of a proximal magnetic disk 308 such that a portion of active component 350 is proximal to magnetic disk 308 and is separated from magnetic disk 308 by a head-media spacing (HMS) $d_{HMS}$. In some examples, active component 350 is a writer, a reader, or an NFT.

Piezoelectric actuator 360 of the example of FIG. 3 is distal to active component 350. In this example, piezoelectric actuator 360 is disposed a distance dx from active component 350 in the x direction. Piezoelectric actuator 360 and active component 350 may be separated by one or more layers of material, one or more features, and/or one or more components of magnetic recording head 340. A rear edge of piezoelectric actuator 360 is a distance $d_1$ from media-facing surface 305 that is greater than a distance $d_2$ between a rear edge of active component 350 and media-facing surface 305.

Mechanical amplification structure 376 is configured to displace active component 350 by transferring a mechanical force exerted by piezoelectric actuator 360 to active component 350. For example, a layer or layers of piezoelectric actuator 360 may expand (expansion $d_E$) or contract (contraction $d_C$) in response to receiving a signal (e.g., a voltage), producing respective expansion forces or contraction forces near piezoelectric actuator 360. Mechanical amplification structure 376 may respond to forces produced by expansion $d_E$ and contraction $d_C$ of piezoelectric actuator 360, producing its own expansion force FTE or contraction force $F_{TC}$. Expansion force FTE or contraction force $F_{TC}$ may exert a force $F_{-z}$ or $F_z$, respectively, on active component 350, displacing active component 350 and changing a protrusion $d_P$ of active component 350. That is, mechanical amplification structure 376 may effectively enable a piezoelectric actuator 360 that is distal to active component 350 to displace active component 350 by transferring a force of expansion $d_E$ or a force of contraction $d_C$ over a distance greater than dx and exerting a force $F_{-z}$ or $F_z$, respectively, on active component 350. In some examples, placing piezoelectric actuator 360 distal to active component 350 and displacing active component 350 by transferring expansion and contraction forces through mechanical amplification structure 376 may enable piezoelectric actuator 360 to be utilized in a magnetic recording head 340 that does not have space to include piezoelectric actuator 360 proximal to active component 350 (e.g., due to features and/or other components). In some examples, placing piezoelectric actuator 360 distal to active component 350 and displacing active component 350 by transferring expansion and contraction forces through mechanical amplification structure 376 may protect active component 350 and/or other proximal components and/or features from signals that are applied to expand and contract piezoelectric actuator 360 (e.g., voltages).

Figure 4:
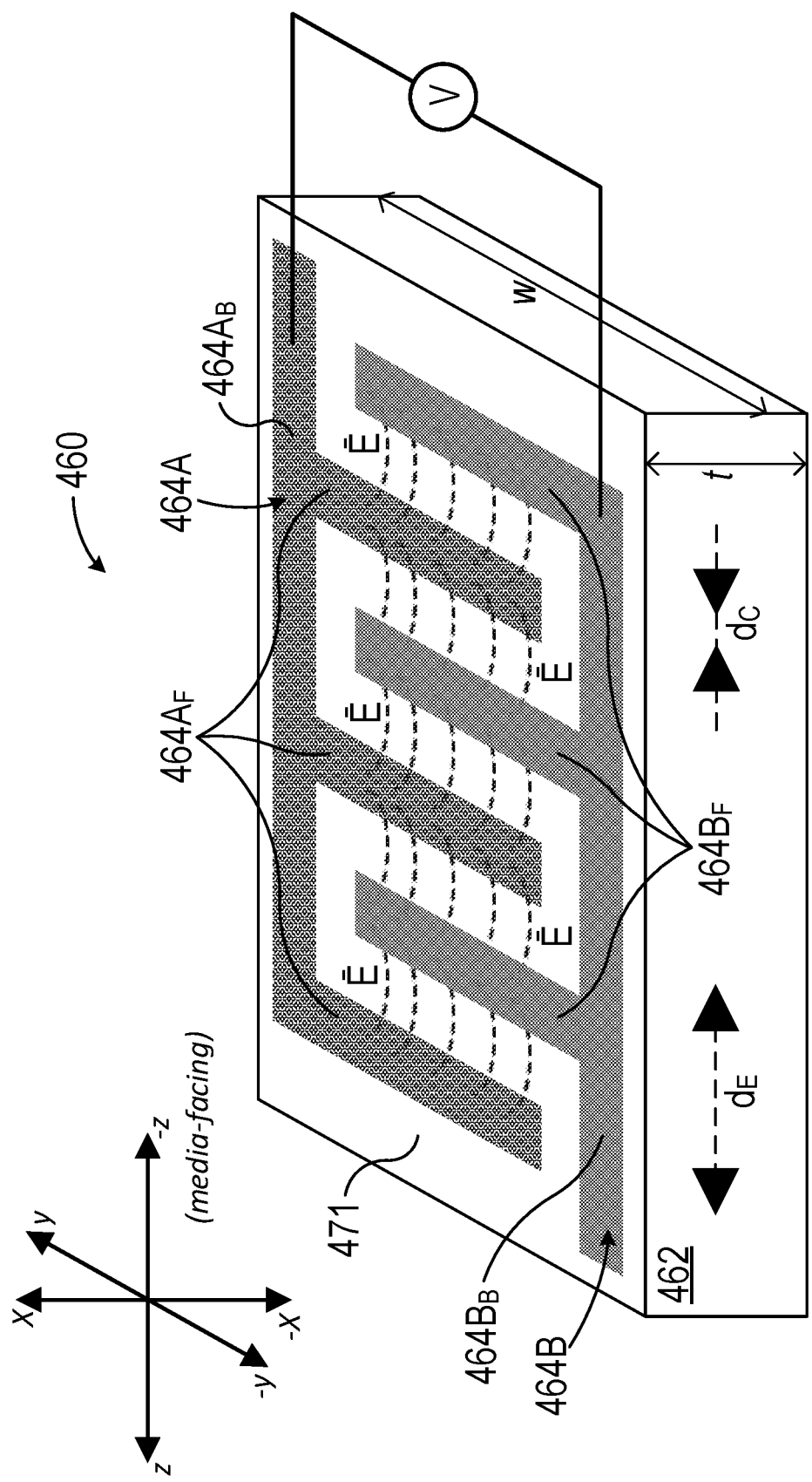
FIG. 4 is a perspective view of an example piezoelectric actuator of a magnetic recording head, in accordance with aspects of this disclosure.

FIG. 4 is a perspective view of an example piezoelectric actuator of an example magnetic recording head, in accordance with aspects of this disclosure. Piezoelectric actuator 460 may be an example of piezoelectric actuator 260 of FIG. 2. Piezoelectric actuator 460 may be an example of piezoelectric actuator 360 for FIG. 3. Piezoelectric actuator 460 includes a piezoelectric layer 462, a first electrode 464A and a second electrode 464B. Piezoelectric layer 462 includes a piezoelectric material. Examples of piezoelectric materials include lead zirconate titanate (PZT), aluminum nitride (AlN), lead magnesium niobate-lead titanate (PMN-PT), sodium potassium niobate, polycrystalline zinc oxide (ZnO), sodium tungstate, some polymers such as polyvinylidene fluoride (PVDF), or other known, or future known, piezoelectric materials. In some examples, a piezoelectric material may include a composite (e.g., a polydimethylsiloxane (PDMS)/PZT composite).

First electrode 464A and second electrode 464B are coupled to piezoelectric layer 462. In the example of FIG. 4, first electrode 464A and second electrode 464B are interdigitated electrodes (IDEs). That is, each of first electrode 464A and second electrode 464B include an elongated base ($464A_B$ and $464B_B$, respectively) and a plurality of elongated fingers ($464A_F$ and $464B_F$, respectively). The elongated fingers of $464A_F$ and $464B_F$ protrude from and are substantially perpendicular to their respective elongated base $464A_B$ and $464B_B$. First electrode 464A and second electrode 464B are coupled to a surface 471 of piezoelectric layer 462. First electrode 464A and second electrode 464B are arranged on surface 471 of piezoelectric layer 462 such that elongated base $464A_B$ of first electrode 464A is substantially parallel to elongated base $464B_B$ of second electrode 464B, elongated fingers $464A_F$ of first electrode 464A point toward elongated base $464B_B$ of second electrode 464B, and elongated fingers $464B_F$ of second electrode 464B point toward elongated base $464A_B$ of first electrode 464A. A space between elongated base $464A_B$ of first electrode 464A and elongated base 464B$_B$ of second electrode 464B is occupied by an interdigitated arrangement of alternating and substantially parallel elongated fingers 464A$_F$ of first electrode 464A and elongated fingers 464B$_F$ of second electrode 464B.

Applying a voltage V between first electrode 464A and second electrode 464B may produce electric fields $\overline{E}$ between elongated fingers 464A$_F$ of first electrode 464A and elongated fingers 464B$_F$ of second electrode 464B. Electric fields $\overline{E}$ may penetrate piezoelectric layer 462 and induce polarization in a piezoelectric material of piezoelectric layer 462, causing piezoelectric layer 462 to expand (expansion $d_E$) or contract ($d_C$), depending on the directions of applied voltage V and the produced electric fields $\overline{E}$. Piezoelectric actuator 460 of FIG. 4 demonstrates an example of a piezoelectric material of piezoelectric layer 462 having a $d_{33}$ charge constant. An electric field $\overline{E}$ oriented parallel to the z dimension in a piezoelectric material having a $d_{33}$ charge constant produces expansion $d_E$ or contraction $d_C$ in the z dimension, that is, parallel to electric field $\overline{E}$. Piezoelectric actuator 460 may be oriented in a magnetic recording head (e.g., magnetic recording head 240 of FIG. 2, magnetic recording head 340 of FIG. 3) such that expansion $d_E$ and contraction $d_C$ are in a dimension that is substantially orthogonal to a media-facing surface of the respective magnetic recording head (e.g., media-facing surface 205, media-facing surface 305), producing displacement of an active component (e.g., active component 250, active component 350) and change in protrusion $d_P$ of the respective active component from the respective media-facing surface. The magnitude of $d_E$ and/or $d_C$ under an applied voltage, and thus the magnitude of forces applied to an active component (e.g., forces $F_{-z}$ or $F_z$ of FIG. 2 or FIG. 3) may be affected by a thickness t (in the x dimension) and/or a width w (in the y dimension) of piezoelectric layer 462. In some examples, the x dimension is a down-track dimension of an associated magnetic recording head (e.g., magnetic recording head 240 of FIG. 2, magnetic recording head 340 of FIG. 3). In some examples, the y dimension is a cross-track dimension of an associated magnetic recording head (e.g., magnetic recording head 240 of FIG. 2, magnetic recording head 340 of FIG. 3).

Figure 5:
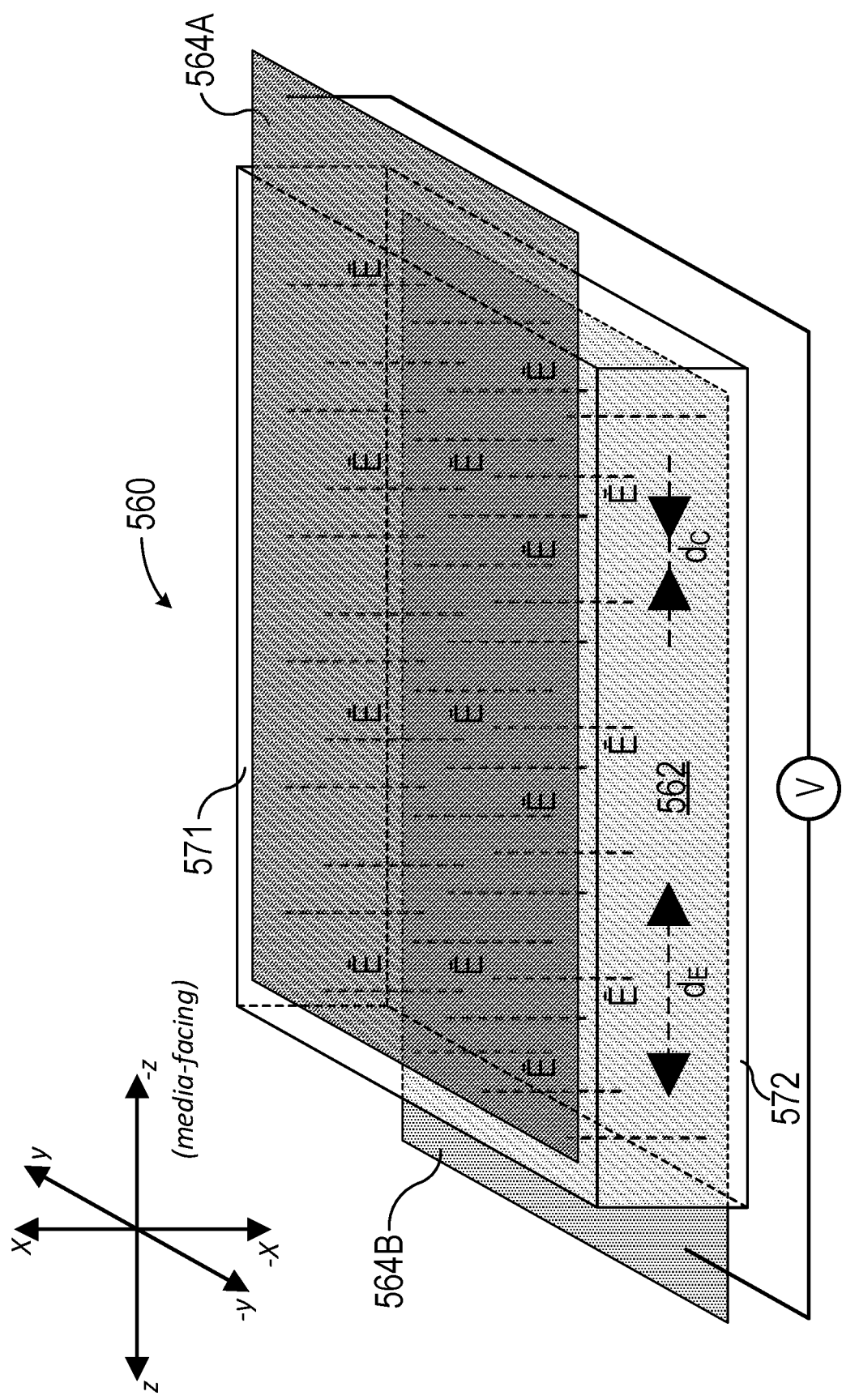
FIG. 5 is a perspective view of an example piezoelectric actuator of a magnetic recording head, in accordance with aspects of this disclosure.

FIG. 5 is a perspective view of an example piezoelectric actuator of an example magnetic recording head, in accordance with aspects of this disclosure. Piezoelectric actuator 560 may be an example of piezoelectric actuator 260 of FIG. 2. Piezoelectric actuator 560 may be an example of piezoelectric actuator 360 for FIG. 3. Piezoelectric actuator 560 includes a piezoelectric layer 562, a first electrode 564A, and a second electrode 564B. Piezoelectric layer 562 includes a piezoelectric material. First electrode 564A and second electrode 564B are coupled to piezoelectric layer 562. In the example of FIG. 5, first electrode 564A and second electrode 564B are planar electrodes. First electrode 564A is coupled to a first surface 571 of piezoelectric layer 562. Second electrode 564B is coupled to a second surface 572 of piezoelectric layer 562. Second surface 572 is opposite and substantially parallel to first surface 571.

Applying a voltage V between first electrode 564A and second electrode 564B may produce electric fields $\overline{E}$ in piezoelectric layer 562 between first electrode 564A and second electrode 564B. Electric fields $\overline{E}$ may induce a polarization in a piezoelectric material of piezoelectric layer 562, causing piezoelectric layer 562 to expand (expansion $d_E$) or contract ($d_C$), depending on the directions of electric fields $\overline{E}$. Piezoelectric actuator 560 of FIG. 5 demonstrates an example of a piezoelectric material of piezoelectric layer having a $d_{31}$ charge constant. An electric field $\overline{E}$ oriented parallel to the x dimension in a piezoelectric material having a $d_{31}$ charge constant produces expansion $d_E$ or contraction $d_C$ in the z dimension, that is, perpendicular to electric field $\overline{E}$. Piezoelectric actuator 560 may be oriented in a magnetic recording head (e.g., magnetic recording head 240 of FIG. 2, magnetic recording head 340 of FIG. 3) such that expansion $d_E$ and contraction $d_C$ are in a dimension that is substantially orthogonal to a media-facing surface of the respective magnetic recording head (e.g., media-facing surface 205, media-facing surface 305), producing a displacement of an active component (e.g., active component 250, active component 350) and change in protrusion $d_P$ of the respective active component from the media-facing surface. In some examples, the x dimension is a down-track dimension of an associated magnetic recording head (e.g., magnetic recording head 240 of FIG. 2, magnetic recording head 340 of FIG. 3). In some examples, the y dimension is a cross-track dimension of an associated magnetic recording head (e.g., magnetic recording head 240 of FIG. 2, magnetic recording head 340 of FIG. 3).

Figure 6A:
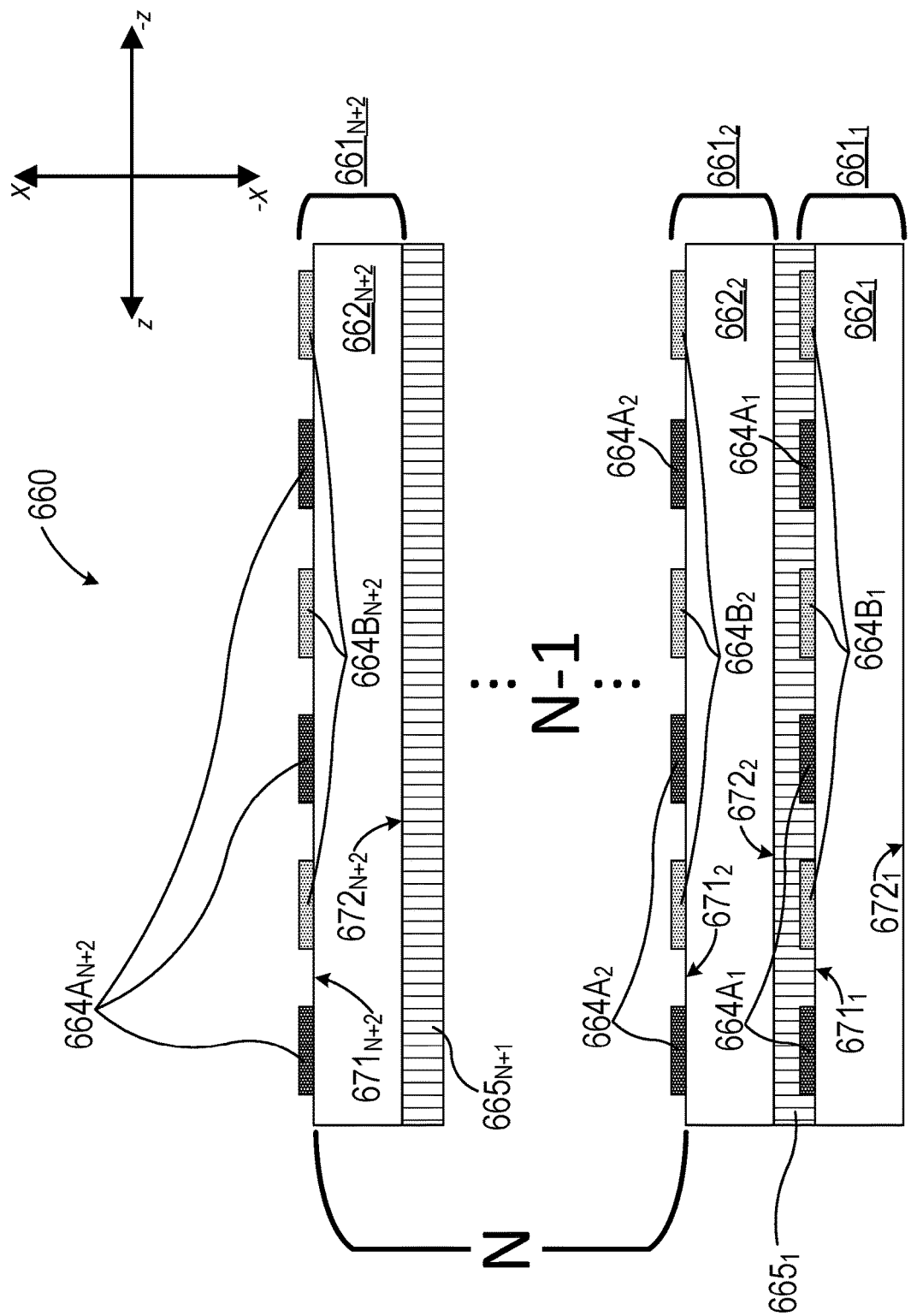
FIG. 6A is a cross-sectional view of an example piezoelectric actuator of a magnetic recording head, in accordance with aspects of this disclosure.

FIG. 6A is a cross-sectional view of an example piezoelectric actuator of an example magnetic recording head, in accordance with aspects of this disclosure. Piezoelectric actuator 660 may be an example of piezoelectric actuator 260 of FIG. 2. Piezoelectric actuator 660 may be an example of piezoelectric actuator 360 for FIG. 3.

Piezoelectric actuator 660 includes a plurality of piezoelectric elements 661. Piezoelectric elements 661 are provided in a stacked configuration along a stacking direction x, with each piezoelectric element 661 adjacent (e.g., adjacent and contacting, adjacent and separated by a layer or layers) to at least one other piezoelectric element 661. In some examples, the x dimension of FIG. 6A is a down-track dimension of an associated magnetic recording head (e.g., magnetic recording head 240 of FIG. 2, magnetic recording head 340 of FIG. 3).

Each piezoelectric element 661 includes a piezoelectric layer 662, a first electrode 664A coupled to its respective piezoelectric layer 662, and a second electrode 664B coupled to its respective the piezoelectric layer 662. Each piezoelectric layer 662 includes a first surface 671 and a second surface 672 that are substantially parallel to each other. First surface 671 and second surface 672 of piezoelectric layer 662 of each of the plurality of piezoelectric elements 661 are substantially orthogonal to stacking direction x. First electrode 664A and second electrode 664B of each piezoelectric element 661 are interdigitated electrodes that are coupled to first surface 671 of piezoelectric layer 662 of each piezoelectric element 661.

Each piezoelectric layer 662 includes a piezoelectric material such that a voltage applied between a first electrode 664A and a second electrode 664B that are coupled to each piezoelectric layer 662 may cause each piezoelectric layer 662 to expand or contract, depending on the directions of electric fields $\overline{E}$ produced by the applied voltage. Simultaneously applying a voltage between the first electrode 664A and the second electrode 664B of each piezoelectric element 661 may cause each piezoelectric layer 662 to expand or contract at the same time (e.g., in the z dimension). In some examples, a piezoelectric actuator 660 that includes multiple piezoelectric layers 662, each with respective electrodes 664A and 664B, may enable piezoelectric actuator 660 to displace an active component of a magnetic recording head (e.g., active component 250 of FIG. 2, active component 350) with a higher stroke efficiency than a piezoelectric actuator that does not include multiple piezoelectric layers.

This higher stroke efficiency may be enabled by a more uniform electric field penetration of the piezoelectric material that is provided by having multiple electrodes 664A and 664B. That is, in contrast to having a single layer of a piezoelectric material wherein a majority of an applied voltage, and thus an electric field, is distributed in a volume near the surface to which the electrodes are coupled, stacking multiple piezoelectric elements, each with a piezoelectric layer and two electrodes, may ensure that a larger total volume of piezoelectric material of the piezoelectric element is exposed to an electric field and is thus able to expand and contract in response.

The plurality of piezoelectric elements 661 of FIG. 6A includes a first piezoelectric element $661_1$ and a second piezoelectric element $661_2$ adjacent to first piezoelectric element $661_1$. First piezoelectric element $661_1$ includes a piezoelectric layer $662_1$, a first electrode $664A_1$, and a second electrode $664B_1$. First electrode $664A_1$ and second electrode $664B_1$ are coupled to a first surface $671_1$ of piezoelectric layer $662_1$. Second piezoelectric element $661_2$ includes a piezoelectric layer $662_2$, a first electrode $664A_2$, and a second electrode $664B_2$. First electrode $664A_2$ and second electrode $664B_2$ are coupled to a first surface $671_2$ of piezoelectric layer $662_2$. A second surface $672_2$ of piezoelectric layer $662_2$ of second piezoelectric element $661_2$ faces and is substantially parallel to first surface $671_1$ of piezoelectric layer $662_1$ of first piezoelectric element $661_1$.

The plurality of piezoelectric elements 661 may further include at least one additional piezoelectric element 661. In the example of FIG. 6A, piezoelectric actuator 660 includes first piezoelectric element $661_1$, second piezoelectric element $661_2$, and N additional piezoelectric elements 661. That is, the total number of piezoelectric elements 661 of this example is N+2, with piezoelectric element $661_{N+2}$ disposed at an opposite end of piezoelectric actuator 660 from piezoelectric element $661_1$. Piezoelectric element $661_{N+2}$ includes a piezoelectric layer $662_{N+2}$, a first electrode $664A_{N+2}$, and a second electrode $664B_{N+2}$. First electrode $664A_{N+2}$ and second electrode $664B_{N+2}$ are coupled to a first surface $671_{N+2}$ of piezoelectric layer $662_{N+2}$. A second, opposite surface $672_{N+2}$ of piezoelectric layer $662_{N+2}$ faces the other piezoelectric elements 661 of the plurality of piezoelectric elements 661.

A remaining N−1 piezoelectric elements 661 may be disposed between piezoelectric element $661_2$ and piezoelectric element $661_{N+2}$, with first piezoelectric element $661_1$, second piezoelectric element $661_2$, piezoelectric element $661_{N+2}$, and any remaining N−1 piezoelectric elements 661 provided in a stacked configuration along stacking direction x. Each remaining N−1 piezoelectric element 661 includes a piezoelectric layer 662, a first electrode 664A, and a second electrode 664B. First electrode 664A and second electrode 664B of each remaining N−1 piezoelectric element 661 are coupled to the first surface 671 of the piezoelectric layer 662 of each remaining N−1 piezoelectric element 661. The second surface 672 of the piezoelectric layer 662 of each remaining N−1 piezoelectric element 661 faces and is substantially parallel to the first surface 671 of an adjacent piezoelectric element 661.

An intervening insulating layer $665_1$ may be disposed between first piezoelectric element $661_1$ and second piezoelectric element $661_2$. Insulating layer $665_1$ is configured to electrically isolate first piezoelectric element $661_1$ and second piezoelectric element $661_2$ from each other. Insulating layer $665_1$ may include an electrically insulating material (e.g., silicon dioxide, aluminum oxide, an electrically insulating polymer). Insulating layer $665_1$ is coupled to first surface $671_1$ of piezoelectric layer $662_1$ of first piezoelectric element $661_1$, first electrode $664A_1$ of first piezoelectric element $661_1$, second electrode $664B_1$ of first piezoelectric element $661_1$, and second surface $672_2$ of piezoelectric layer $662_2$ of second piezoelectric element $661_2$. First piezoelectric element $661_1$, insulating layer $665_1$, and second piezoelectric element $661_2$ are provided in a stacked configuration along stacking direction x.

Intervening insulating layers 665 may be disposed between each adjacent piezoelectric element 661 of the plurality of piezoelectric elements 661. That is, a piezoelectric actuator 660 that includes N+2 piezoelectric elements 661 may include N+1 insulating layers 665. Each insulating layer may be coupled to the first surface 671 of the piezoelectric layer 662 of a first adjacent piezoelectric element 661, the first electrode 664A of the first adjacent piezoelectric element 661, the second electrode 664B of the first adjacent piezoelectric element 661, and the second surface 672 of a second adjacent piezoelectric element 661 that is adjacent to the first adjacent piezoelectric element 661. In this example, each piezoelectric element 661 of the plurality of piezoelectric elements 661 and each insulating layer 665 are provided in a stacked configuration along stacking direction x. It should be noted, however, that insulating layers 665 are optional and are in no way required for successful operation of piezoelectric actuator 660. That is, some examples will omit insulating layers 665 between adjacent piezoelectric elements 661. These examples are contemplated and are within the scope of this disclosure.

Figure 6B:
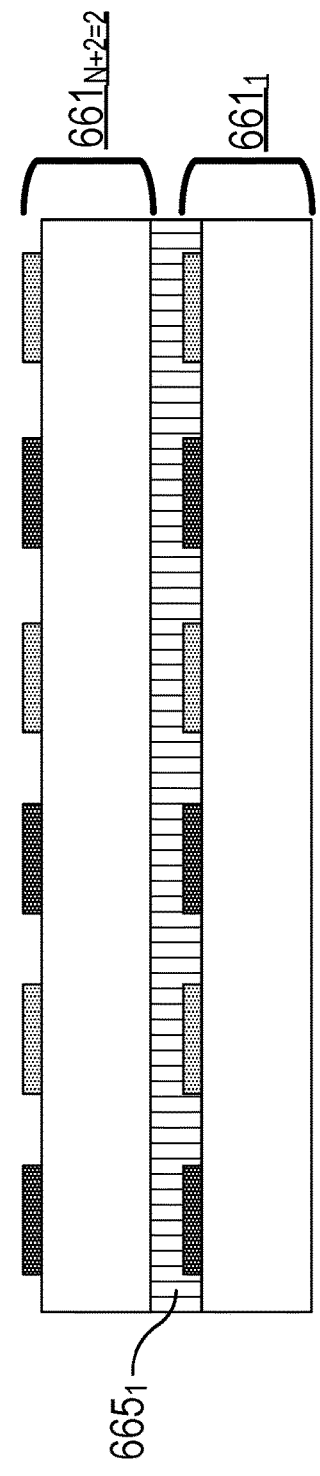
FIG. 6B is a cross-sectional view of an example piezoelectric actuator of a magnetic recording head, in accordance with aspects of this disclosure.

FIG. 6B is a cross-sectional view of an example piezoelectric actuator of an example magnetic recording head, in accordance with aspects of this disclosure. Piezoelectric actuator 660 of FIG. 6B may be an example of piezoelectric actuator 660 of FIG. 6A when the number N of additional piezoelectric elements 661 is zero. That is, piezoelectric actuator 660 of this example includes a first piezoelectric element $661_1$ and an adjacent second piezoelectric element $661_2$. An intervening insulating layer $665_1$ may be disposed between first piezoelectric element $661_1$ and second piezoelectric element $661_2$.

Figure 6C:
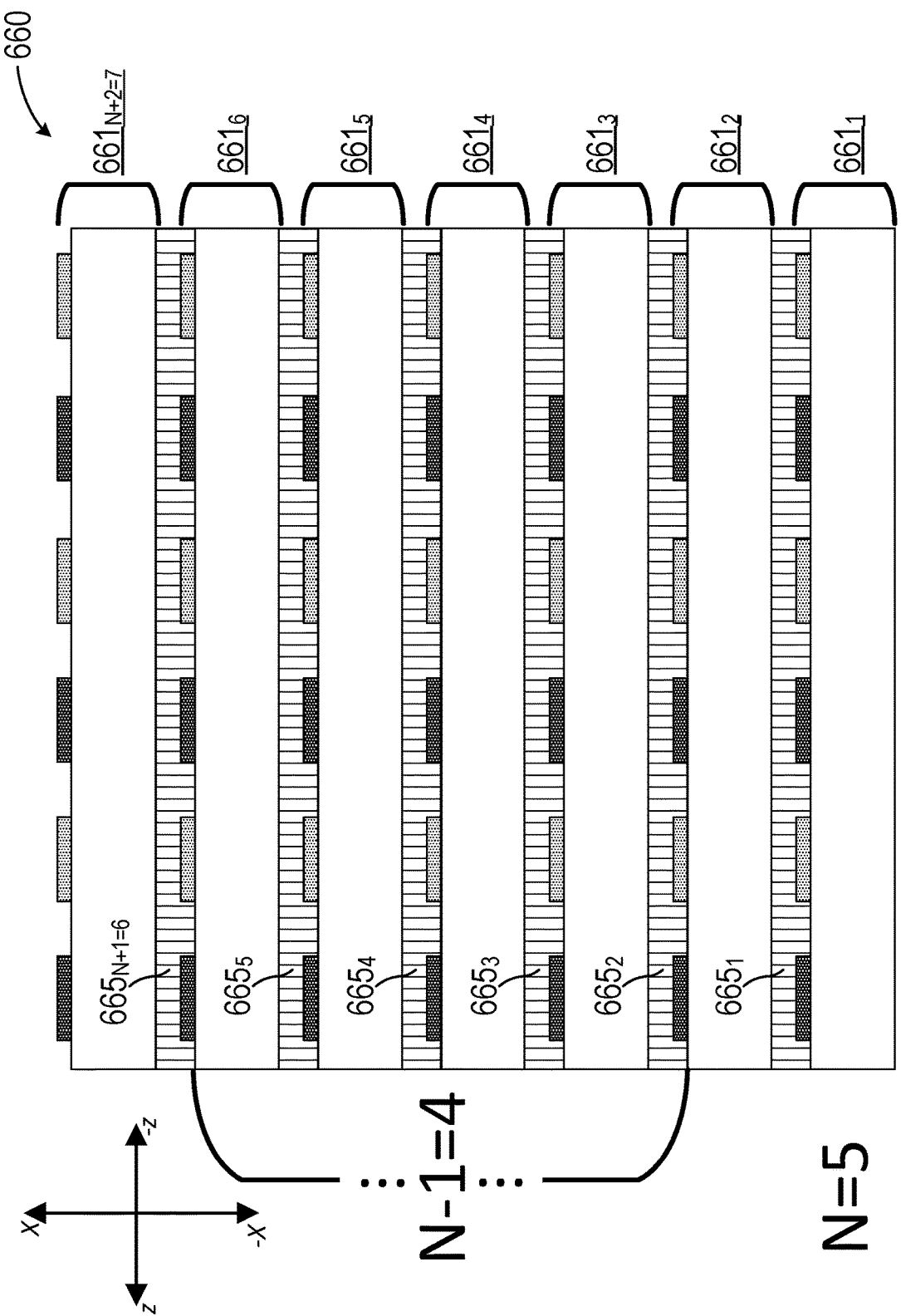
FIG. 6C is a cross-sectional view of an example piezoelectric actuator of a magnetic recording head, in accordance with aspects of this disclosure.

FIG. 6C is a cross-sectional view of an example piezoelectric actuator of an example magnetic recording head, in accordance with aspects of this disclosure. Piezoelectric actuator 660 of FIG. 6C may be an example of piezoelectric actuator 660 of FIG. 6A when the number N of additional piezoelectric elements 661 is five. That is, piezoelectric actuator 660 of this example includes a total of N+2=7 piezoelectric elements 661 (i.e., a first piezoelectric element $661_1$, a second piezoelectric element $661_2$, a third piezoelectric element 6613, a fourth piezoelectric element 6614, a fifth piezoelectric element 6615, a sixth piezoelectric element 6616, and a seventh piezoelectric element 6617). An intervening insulating layer 665 may be disposed between each adjacent piezoelectric element 661.

Figure 7A:
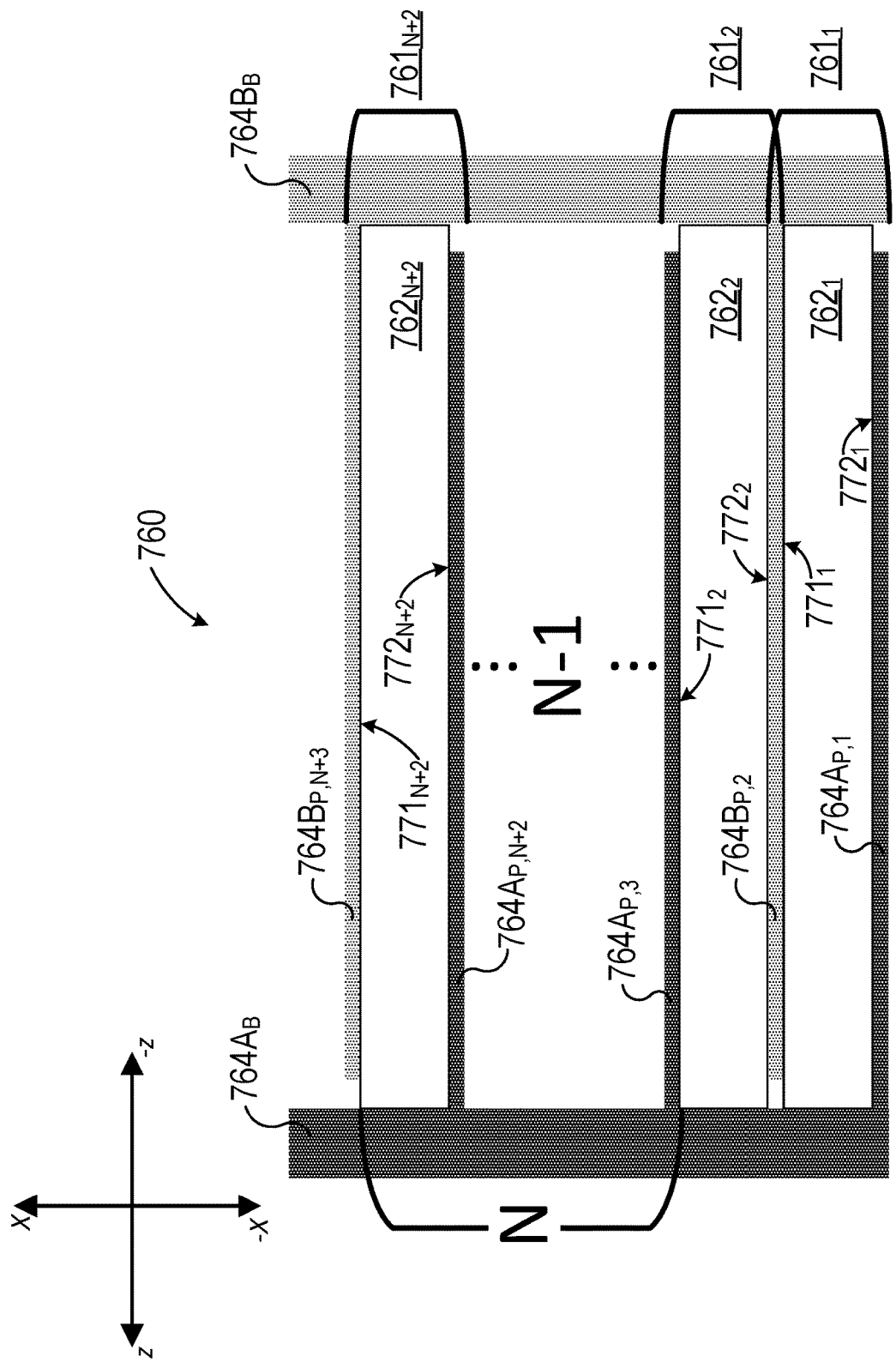
FIG. 7A is a cross-sectional view of an example piezoelectric actuator of a magnetic recording head, in accordance with aspects of this disclosure.

FIG. 7A is a cross-sectional view of an example piezoelectric actuator of an example magnetic recording head, in accordance with aspects of this disclosure. Piezoelectric actuator 760 may be an example of piezoelectric actuator 260 of FIG. 2. Piezoelectric actuator 760 may be an example of piezoelectric actuator 360 for FIG. 3.

Piezoelectric actuator 760 includes a plurality of piezoelectric elements 761. Piezoelectric elements 761 are provided in a stacked configuration along a stacking direction x, with each piezoelectric element 761 adjacent (e.g., adjacent and contacting, adjacent and separated by a layer or layers) to at least one other piezoelectric element 761. In some examples, the x dimension of FIG. 7A is a down-track dimension of an associated magnetic recording head (e.g., magnetic recording head 240 of FIG. 2, magnetic recording head 340 of FIG. 3).

Each piezoelectric element 761 includes a piezoelectric layer 762 that includes a piezoelectric material, an electrode 764$A_P$ coupled to its respective piezoelectric layer 762, and an electrode 764$B_P$ coupled to its respective the piezoelectric layer 762. Each piezoelectric layer 762 includes a first surface 771 and a second surface 772 that are substantially parallel to each other. First surface 771 and second surface 772 of the piezoelectric layer 762 of each of the plurality of piezoelectric elements 761 are substantially orthogonal to stacking direction x. Electrode 764$A_P$ and electrode 764$B_P$ of each piezoelectric element 761 are planar electrodes that are substantially orthogonal to stacking direction x. Piezoelectric layers 762, electrodes 764$A_P$, and electrodes 764$B_P$ are provided in a stacked configuration along stacking direction x such that an electrode (e.g., either an electrode 764$A_P$ or an electrode 764$B_P$) is disposed between and coupled to piezoelectric layers 762 of adjacent piezoelectric elements 761. That is, two adjacent piezoelectric elements 761 of piezoelectric actuator 760 share a common electrode (e.g., either an electrode 764$A_P$ or an electrode 764$B_P$). An electrode (e.g., an electrode 764$A_P$ or an electrode 764$B_P$) of each piezoelectric element 761 is coupled to first surface 771 of the piezoelectric layer 762 of each piezoelectric element 761, and an opposite electrode (e.g., an electrode 764$B_P$ or an electrode 764$A_P$) of each piezoelectric element 761 is coupled to second surface 772 of the piezoelectric layer 762 of each piezoelectric element 761. That is, electrodes 764$A_P$ and electrodes 764$B_P$ are arranged to alternate between pairs of adjacent piezoelectric elements 761 such that each piezoelectric layer 762 is coupled to an electrode 764$A_P$ and an electrode 764$B_P$.

Electrodes 764$A_P$ are electrically coupled to an electrode base 764$A_B$, and electrodes 764$B_P$ are coupled to an electrode base 764$B_B$. A voltage applied between electrode base 764$A_B$ and electrode base 764$B_B$ may therefore be distributed and applied between electrodes 764$A_P$ and 764$B_P$ and across the piezoelectric layer 762 of each piezoelectric element 761. Each piezoelectric layer 762 includes a piezoelectric material such that a voltage applied between the first electrode 764$A_P$ and the second electrode 764$B_P$ that are coupled to each piezoelectric layer 762 may cause each piezoelectric layer 762 to expand or contract, depending on the directions of electric fields $\overline{E}$ produced by the applied voltage. Simultaneously applying a voltage between the first electrode 764A and the second electrode 764B of each piezoelectric element 761 may cause each piezoelectric layer 762 to expand or contract at the same time (e.g., in the z dimension). In some examples, a piezoelectric actuator 760 that includes multiple piezoelectric layers 762, each with a respective electrode 764A and 764B disposed between itself and a piezoelectric layer 762 of an adjacent piezoelectric element, may enable piezoelectric actuator 760 to displace an active component of a magnetic recording head (e.g., active component 250 of FIG. 2, active component 350 of FIG. 3) with a higher stroke efficiency than a piezoelectric actuator that does not include multiple piezoelectric layers. A higher stroke efficiency may be enabled by having a stronger electric field applied across the piezoelectric material of each piezoelectric layer 762. A single thick layer of a piezoelectric material may require a higher voltage to produce a sufficiently strong electric field to polarize (and thus expand or contract) the piezoelectric material. In contrast, stacking multiple piezoelectric elements 761, each with electrodes 764A and 764B coupled to opposite surfaces of a piezoelectric layer 762, may ensure that each piezoelectric layer 762 is sufficiently thin to be polarized by a lower voltage, potentially improving the stroke efficiency and/or reducing the power consumption of piezoelectric actuator 760.

The plurality of piezoelectric elements 761 of FIG. 7A includes a first piezoelectric element 761$_1$, and a second piezoelectric element 761$_2$ adjacent to first piezoelectric element 761$_1$. First piezoelectric element 761$_1$ includes a piezoelectric layer 762$_1$, an electrode 764$A_{P,1}$, and an electrode 764$B_{P,2}$. Electrode 764$B_{P,2}$ is coupled to a first surface 771$_1$ of piezoelectric layer 762$_1$. Electrode 764$A_{P,1}$ is coupled to a second surface 772$_1$ of piezoelectric layer 762$_1$. Second piezoelectric element 761$_2$ includes a piezoelectric layer 762$_2$, electrode 764$B_{P,2}$, and an electrode 764$A_{P,3}$. Electrode 764$A_{P,3}$ is coupled to a first surface 771$_2$ of piezoelectric layer 762$_2$. Electrode 764$B_{P,2}$ is coupled to a second surface 772$_2$ of piezoelectric layer 762$_2$. That is, both first piezoelectric element 761$_1$ and second piezoelectric element 761$_2$ share a common electrode 764$B_{P,2}$.

The plurality of piezoelectric elements 761 may further include at least one additional piezoelectric element 761. In the example of FIG. 7A, piezoelectric actuator 760 includes first piezoelectric element 761$_1$, second piezoelectric element 761$_2$, and N additional piezoelectric elements 761. That is, the total number of piezoelectric elements 761 of this example is N+2, with piezoelectric element 761$N_{+2}$ disposed at an opposite end of piezoelectric actuator 760 from piezoelectric element 761$_1$. Piezoelectric element 761$N_{+2}$ includes a piezoelectric layer 762$_{N+2}$, an electrode 764$A_{P,N+2}$, and an electrode 764$B_{P,N+3}$. Electrode 764$B_{P,N+3}$ is coupled to a first surface 771$_{N+2}$ of piezoelectric layer 762$_{N+2}$. Electrode 764$A_{P,N+2}$ to a second, opposite surface 772$_{N+2}$ of piezoelectric layer 762$_{N+2}$.

A remaining N−1 piezoelectric elements 761 may be disposed between piezoelectric element 761$_2$ and piezoelectric element 761$N_{+2}$, with first piezoelectric element 761$_1$, second piezoelectric element 761$_2$, piezoelectric element 761$N_{+2}$, and any remaining N−1 piezoelectric elements 761 provided in a stacked configuration along stacking direction x. Each remaining N−1 piezoelectric element 761 includes a piezoelectric layer 762, an electrode 764$A_P$, and an electrode 764$B_P$. An electrode (e.g., an electrode 764$A_P$ or an electrode 764$B_P$) of each remaining N−1 piezoelectric element 761 is coupled to first surface 771 of the piezoelectric layer 762 of each remaining N−1 piezoelectric element 761. An opposite electrode (e.g., an electrode 764$B_P$ or an electrode 764$A_P$) of each remaining N−1 piezoelectric element 761 is coupled to second surface 772 of the piezoelectric layer 762 of each remaining N−1 piezoelectric element 761.

Figure 7B:
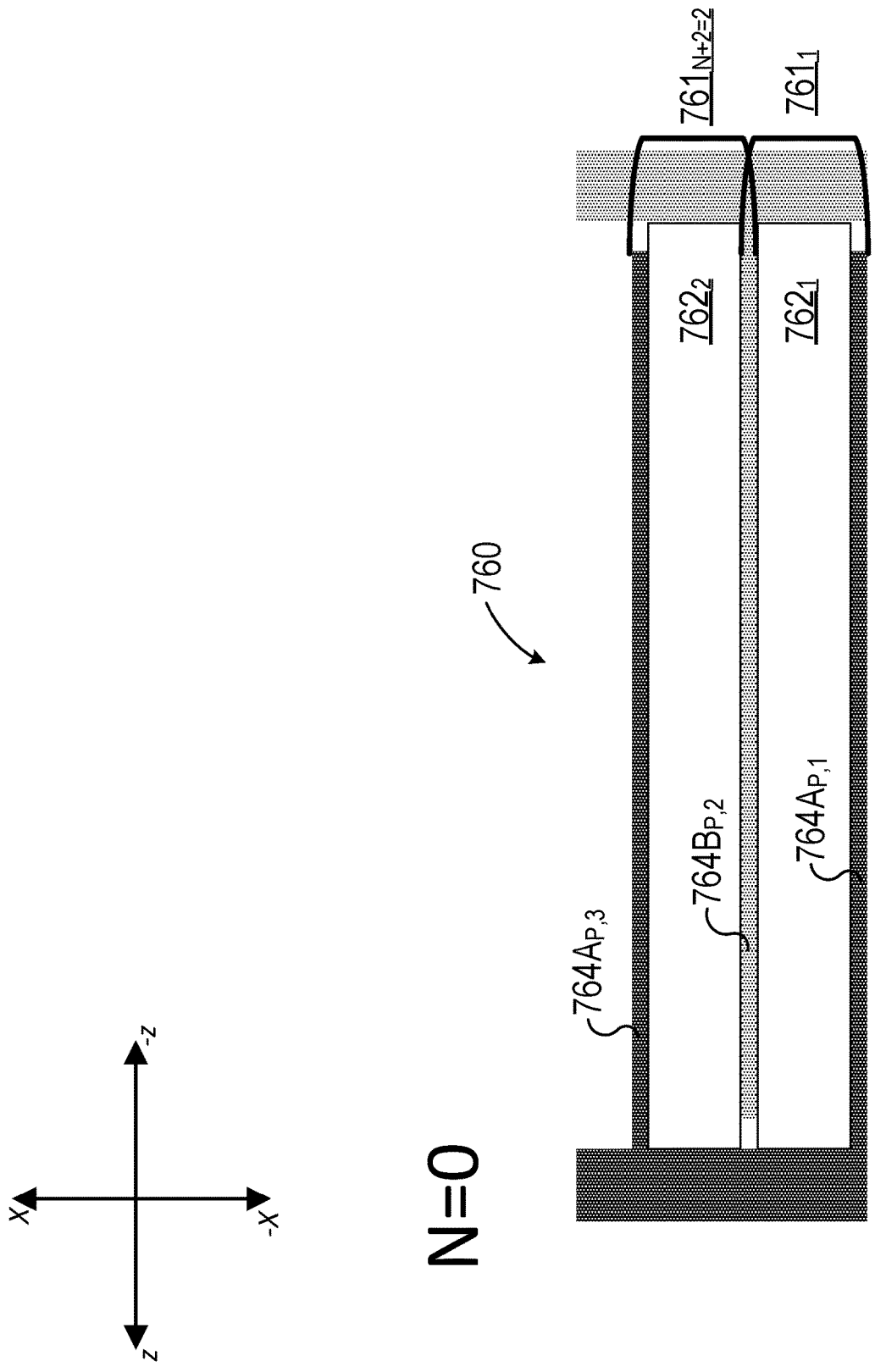
FIG. 7B is a cross-sectional view of an example piezoelectric actuator of a magnetic recording head, in accordance with aspects of this disclosure.

FIG. 7B is a cross-sectional view of an example piezoelectric actuator of an example magnetic recording head, in accordance with aspects of this disclosure. Piezoelectric actuator 760 of FIG. 7B may be an example of piezoelectric actuator 760 of FIG. 7A when the number N of additional piezoelectric elements 761 is zero. That is, piezoelectric actuator 760 of this example includes a first piezoelectric element 761$_1$ and an adjacent second piezoelectric element 761$_2$. An electrode 764$A_{P,1}$ is coupled to a piezoelectric layer 762$_1$ of first piezoelectric element 761$_1$. An electrode 764$A_{P,3}$ is coupled to a piezoelectric layer 762$_2$ of second piezoelectric element 761$N_{+2=2}$. An electrode 764$B_{P,2}$ is disposed between and coupled to piezoelectric layer 762$_1$ of first piezoelectric element 761$_1$ and piezoelectric layer 762$_2$ of second piezoelectric element 761$_2$. That is, first piezoelectric element 761$_1$ and second piezoelectric element 761$_2$ share a common electrode $764B_{P,2}$. Electrode $764A_{P,1}$, piezoelectric layer $762_1$, electrode $764B_{P,2}$, piezoelectric layer $762_2$, and electrode $764A_{P,3}$ are provided in a stacked configuration along a stacking direction x.

Figure 7C:
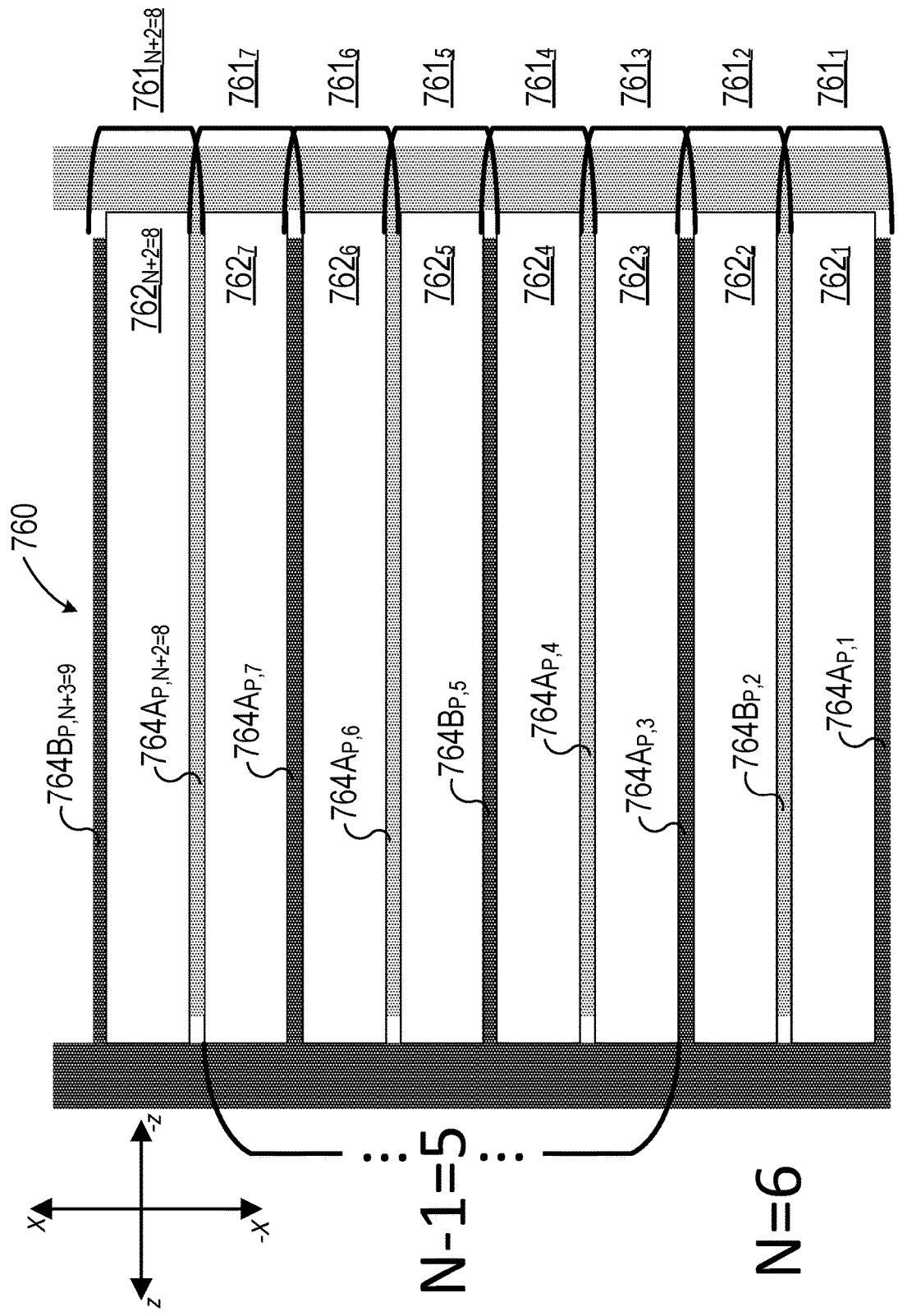
FIG. 7C is a cross-sectional view of an example piezoelectric actuator of a magnetic recording head, in accordance with aspects of this disclosure.

FIG. 7C is a cross-sectional view of an example piezoelectric actuator of an example magnetic recording head, in accordance with aspects of this disclosure. Piezoelectric actuator 760 of FIG. 7C may be an example of piezoelectric actuator 760 of FIG. 7A when the number N of additional piezoelectric elements 761 is six. That is, piezoelectric actuator 760 of this example includes a total of N+2=8 piezoelectric elements 761 (i.e., a first piezoelectric element $761_1$, a second piezoelectric element $761_2$, a third piezoelectric element $761_3$, a fourth piezoelectric element $761_4$, a fifth piezoelectric element $761_5$, a sixth piezoelectric element $761_6$, a seventh piezoelectric element $761_7$, and an eight piezoelectric element $761N_{+2=8}$). Each piezoelectric element 761 includes a piezoelectric layer 762. An electrode $764A_P$ and an electrode $764B_P$ are coupled to opposite surfaces of the piezoelectric layer 762 of each piezoelectric element 761. Piezoelectric layers 762, electrodes $764A_P$, and electrodes $764B_P$ are provided in a stacked configuration along a stacking direction x. An electrode (i.e., either an electrode $764A_P$ or an electrode $764B_P$) is disposed between the piezoelectric layers 762 of each adjacent piezoelectric element 761, with each pair of adjacent piezoelectric elements sharing a common electrode $764A_P$ or $764B_P$.

Figure 8:
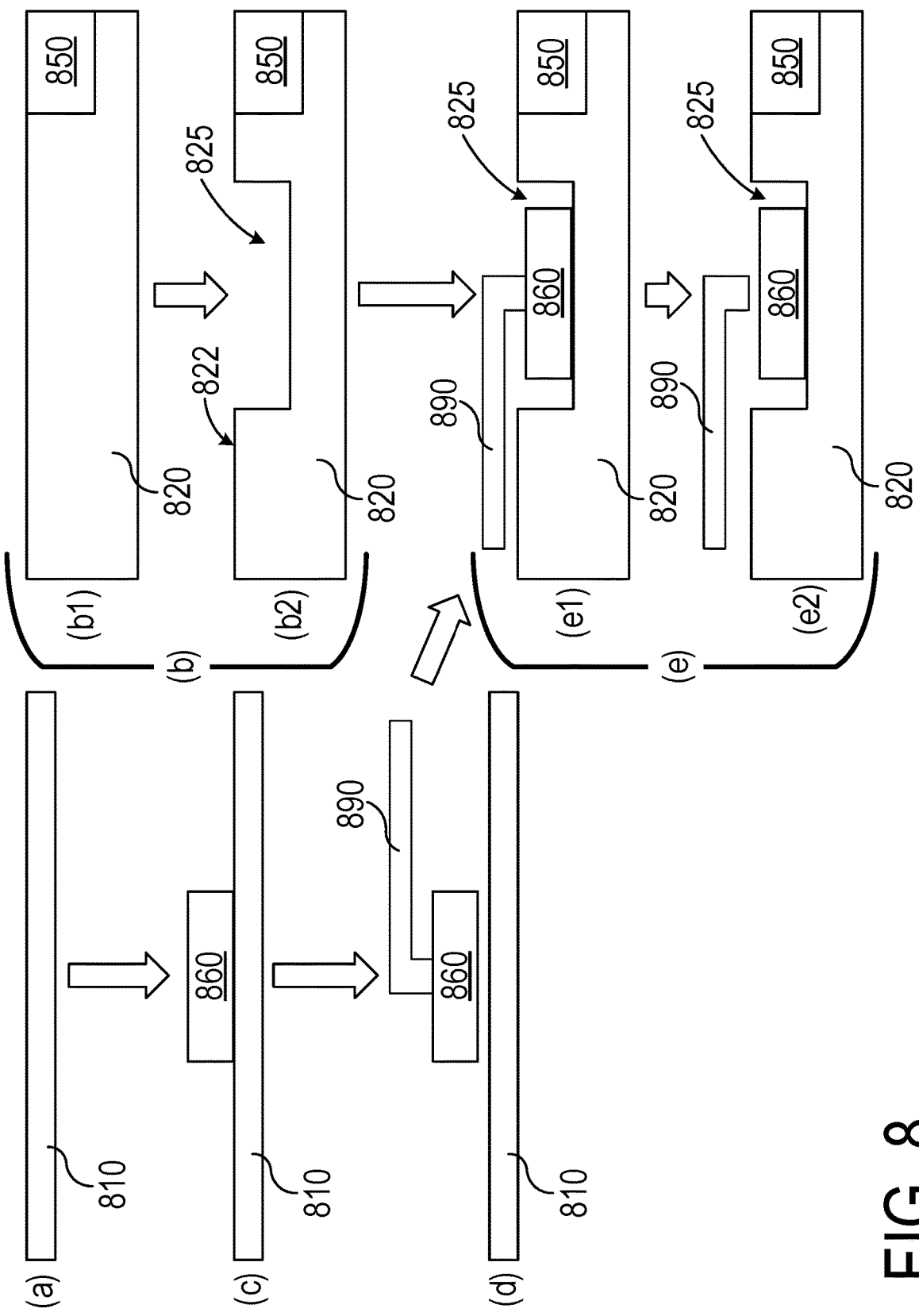
FIG. 8 is a diagram illustrating a method for fabricating a piezoelectric actuator on a source wafer and transferring the piezoelectric actuator to a target wafer, in accordance with aspects of this disclosure.

FIG. 8 is a diagram illustrating a method for fabricating a piezoelectric actuator on a source wafer and transferring the piezoelectric actuator to a target wafer, in accordance with aspects of this disclosure.

In accordance with techniques of this disclosure, a method for making a magnetic recording head including a piezoelectric actuator for controlling head-media spacing (e.g., magnetic recording head 240 of FIG. 2, magnetic recording head 340 of FIG. 3) includes the steps of (a) providing a source wafer 810 on which to fabricate a piezoelectric actuator 860; (b) providing and preparing a target wafer 820; (c) fabricating piezoelectric actuator 860 on source wafer 810; (d) releasing piezoelectric actuator 860 from the source wafer 810; and (e) placing piezoelectric actuator 860 on target wafer 820. Step (b) of the method illustrated in FIG. 8 includes the steps of (b1) providing target wafer 820 and (b2) preparing target wafer 820. Step (b2), preparing target wafer 820, may include the step of etching a trench 825 in a surface 822 of target wafer 820. In the example of the method illustrated in FIG. 8, the step of etching a trench 825 in a surface 822 of target wafer 820 includes etching a trench 825 in proximity to a location of active component 850. Step (e1), placing, with stamp 890, piezoelectric actuator 860 on target wafer 820, includes the step of placing, with stamp 890, piezoelectric actuator 860 in trench 825. Step (e2), decoupling stamp 890 from piezoelectric actuator 860, includes decoupling stamp 890 from piezoelectric actuator 860 such that piezoelectric actuator 860 becomes decoupled from stamp 890 and remains in trench 825 on target wafer 820.

Source wafer 810 may be a silicon wafer or other substrate on which piezoelectric actuator 860 may be fabricated. In some examples, source wafer 810 may be a bare substrate or may include one or more surface layers (e.g., a native oxide of a silicon substrate). In other examples, source wafer 810 may include other components that will be transferred to target wafer 820 (e.g., a laser of a heat-assisted magnetic recording head).

Target wafer 820 is configured as a substrate for fabrication of a magnetic recording head. Target wafer 820 may, for example, be configured as a substrate for fabrication of magnetic recording head 240 of FIG. 2 or magnetic recording head 340 of FIG. 3, and piezoelectric actuator 860 may be a piezoelectric actuator of the magnetic recording head (e.g., piezoelectric actuator 260 of FIG. 2, piezoelectric actuator 360 of FIG. 3). Piezoelectric actuator 860 may be configured for controlling head-media spacing between a component of the magnetic recording head and a magnetic disk. In some examples, target wafer 820 includes one or more features of the magnetic recording head that is being fabricated on target wafer 820. That is, target wafer 820 may include an at least partially fabricated magnetic recording head. Target wafer 820 of FIG. 8, for example, includes an active component 850. Active component 850 may be an example of active component 250 of magnetic recording head 240 of FIG. 2 or active component 350 of magnetic recording head 340 of FIG. 3. Further processing may be completed on target wafer 820 after piezoelectric actuator 860 has been transferred to target wafer 820. Further processing may include steps (not illustrated) for fabricating other features of the magnetic recording head (e.g., a reader, a writer, a near-field transducer of a heat-assisted magnetic recording head, one or more heaters).

In the method illustrated in FIG. 8, the steps of releasing piezoelectric actuator 860 from source wafer 810 and placing piezoelectric actuator 860 on target wafer 820 may be steps of a transfer printing process that include the use of a stamp 890. Stamp 890 may be a stamp of a manufacturing tool that is configured for transfer printing. Step (d), releasing piezoelectric actuator 860 from the source wafer 810, includes the steps of contacting piezoelectric actuator 860 with stamp 890 such that piezoelectric actuator 860, still on source wafer 810, becomes coupled to stamp 890. Adhesive forces between piezoelectric actuator 860 and stamp 890 may be sufficiently strong that piezoelectric actuator 860 remains coupled to stamp 890 and applying a force to stamp 890 (e.g., a force away from source wafer 810) enables piezoelectric actuator 860 to be lifted from source wafer 810. Stamp 890 may include an elastomeric material (e.g., PDMS) that is configured to promote adhesion between stamp 890 and piezoelectric actuator 860, enabling stamp 890 to remain coupled to stamp 890 upon applying a force to lift stamp 890 from source wafer 810.

Step (e), placing piezoelectric actuator 860 on target wafer 820, includes the steps of (e1) placing, with stamp 890, piezoelectric actuator 860 on target wafer 820; and (e2) decoupling stamp 890 from piezoelectric actuator 860 such that piezoelectric actuator 860 becomes decoupled from stamp 890 (e.g., from an elastomeric material of stamp 890) and remains on target wafer 820. Step (e2) may include a step of lifting stamp 890 from target wafer 820. The step of decoupling piezoelectric actuator 860 from stamp 890 may be enabled by providing a surface on target wafer 820 having a stronger adhesion to piezoelectric actuator 860 than adhesion between stamp 890 and piezoelectric actuator 860. That is, piezoelectric actuator 860 may remain adhered to target wafer 820 upon lifting stamp 890 from target wafer 820. Additionally, the step of lifting stamp 890 may include force components that are parallel to a surface of target wafer 820 (e.g., a surface that piezoelectric actuator 860 is adhered to. A combination of such shear forces with lifting forces may act to peel an adhesive material of stamp 890 from piezoelectric actuator 860.

Figure 9:
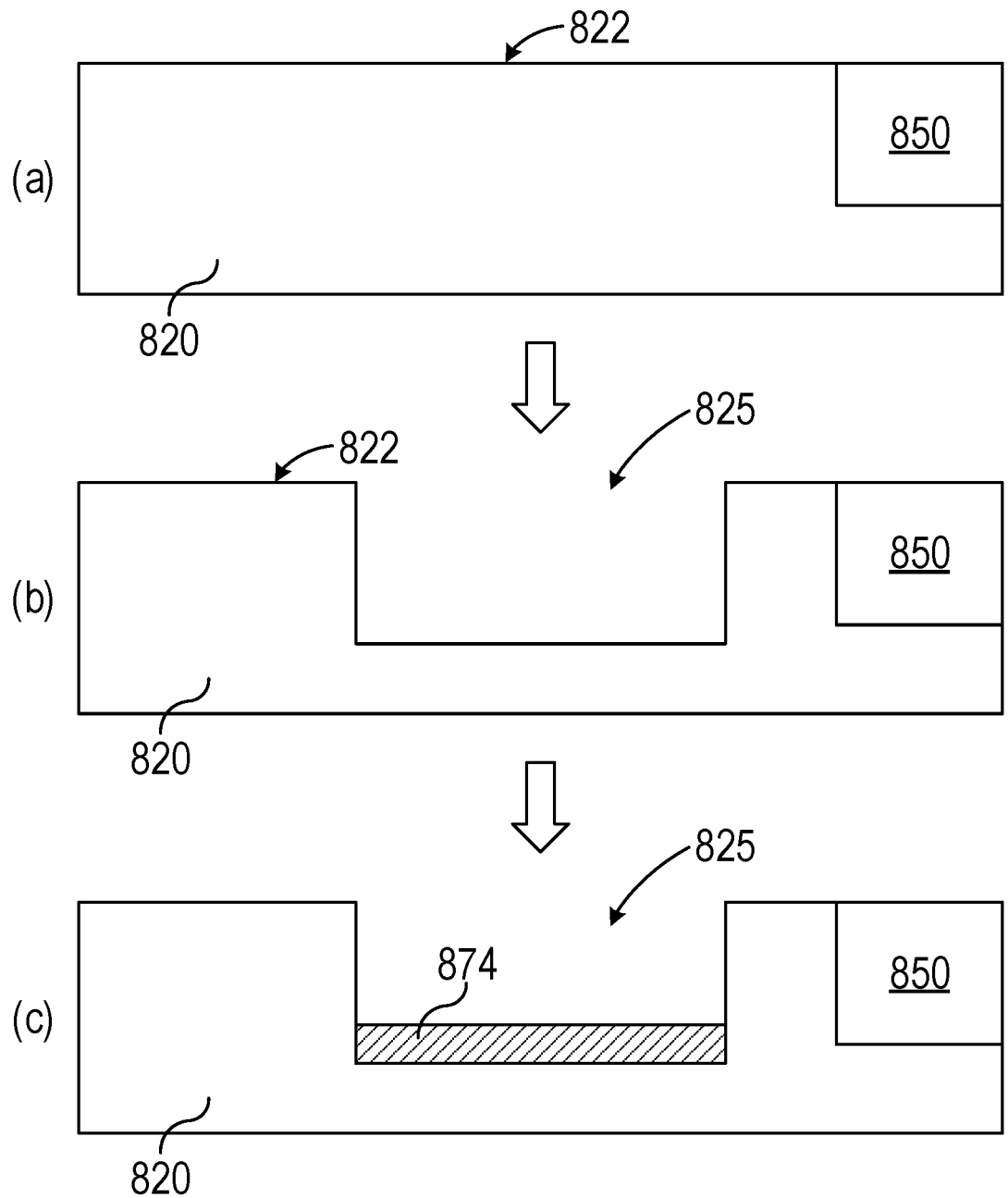
FIG. 9 is a diagram illustrating a method for preparing a target wafer to which a piezoelectric actuator will be transferred, in accordance with aspects of this disclosure.

FIG. 9 is a diagram illustrating a method for preparing a target wafer to which a piezoelectric actuator will be transferred, in accordance with aspects of this disclosure. The method illustrated in FIG. 9 may be an example of step (b), providing and preparing target wafer 820, of FIG. 8. The method illustrated in FIG. 9 includes the steps of (a) providing a target wafer 820; (b) etching a trench 825 in a surface 822 of target wafer 820; and (c) depositing a layer 874 of a mechanically compliant material along a base 826 of trench 825. Step (b) of FIG. 9, etching a trench 825 in a surface 822 of target wafer 820, includes etching a trench in proximity to a location of an active component 850 of an example magnetic recording head. It should be noted that trench 825 is not required to be proximal to an active component of an associated magnetic recording head. For example, magnetic recording head 340 includes a piezoelectric actuator 360 that is disposed distal to an active component 350. It is contemplated that the methods illustrated in FIG. 9 and FIG. 8 may be applied to magnetic recording head 340 of FIG. 3, with piezoelectric actuator 360 being placed in a trench that is etched distal to an active component 350 in a target wafer on which magnetic recording head 340 of FIG. 3 is fabricated.

Layer 874 may be an example of compliant layer 274 of FIG. 2. Step (c) of FIG. 9 occurs after the step of etching a trench 825 in target wafer 820 (e.g., step (b) of FIG. 9) and before the step of placing piezoelectric actuator 860 in trench 825 (e.g., step (e) of FIG. 8), such that layer 874 of mechanically compliant material is disposed between base 826 of trench 825 and piezoelectric actuator 860 after the step of placing piezoelectric actuator 860 in trench 825. In some examples, layer 874 may adhere to a piezoelectric actuator (e.g., piezoelectric actuator 860 of FIG. 8), enabling the piezoelectric actuator to adhere to and remain on target wafer 820 upon transferring the piezoelectric actuator from a source wafer (e.g., in step (e) of FIG. 8).

Figure 10:
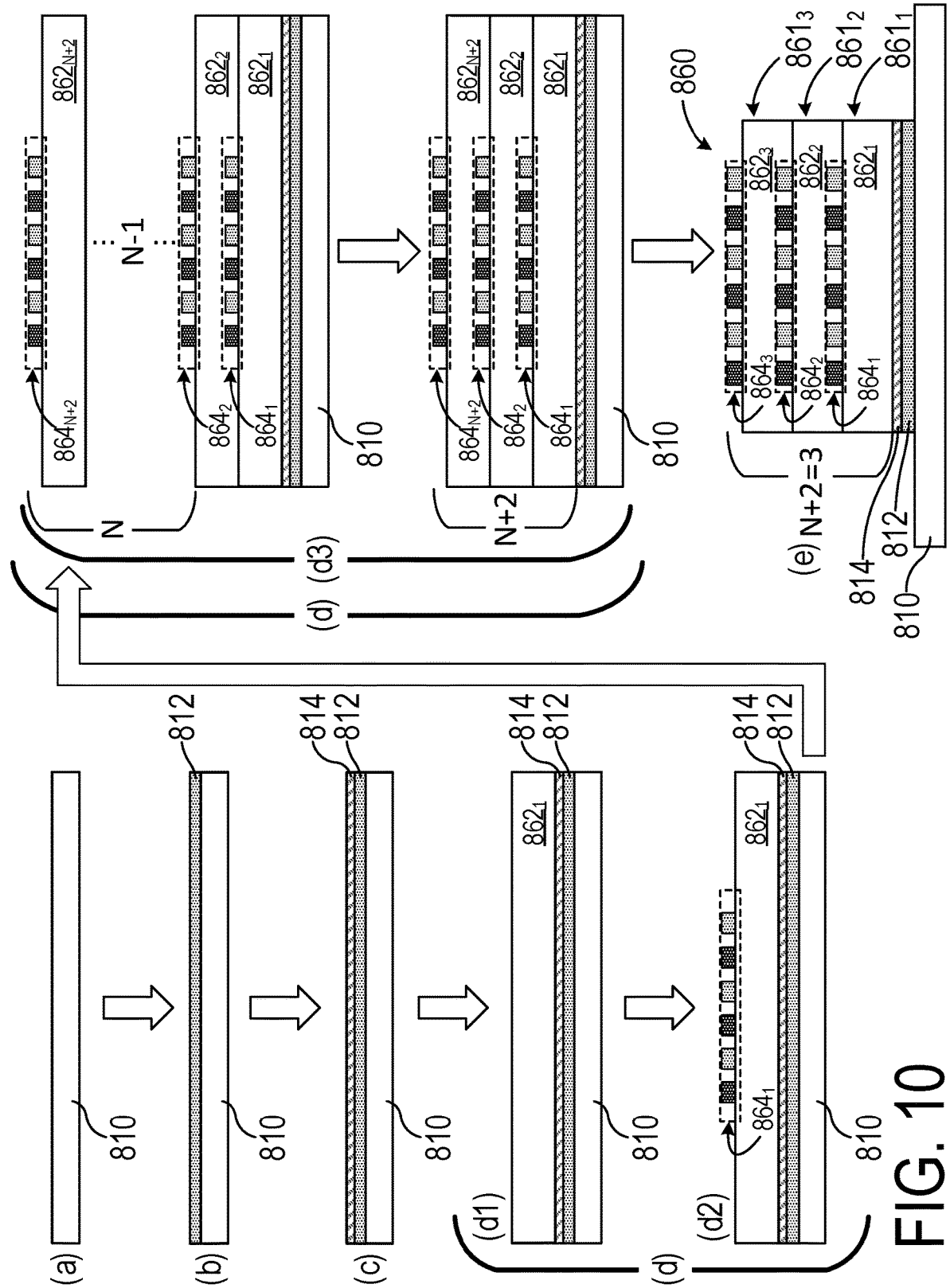
FIG. 10 is a diagram illustrating a method for fabricating a piezoelectric actuator on a source wafer, in accordance with aspects of this disclosure.

FIG. 10 is a diagram illustrating a method for fabricating a piezoelectric actuator on a source wafer, in accordance with aspects of this disclosure. The method illustrated in FIG. 10 illustrates one example of step (c), fabricating piezoelectric actuator 860 on source wafer 810, of FIG. 8. The method illustrated in FIG. 10 includes the steps of (a) providing a source wafer 810 on which to fabricate a piezoelectric actuator 860; (b) providing a sacrificial layer 812 on source wafer 810; (c) depositing a buffer layer 814 after providing sacrificial layer 812 on source wafer 810; (d) depositing one or more piezoelectric layers 862 and one or more sets of electrodes 864 on source wafer 810; and (e) patterning the one or more piezoelectric layers 862 to segregate and define piezoelectric actuator 860.

Sacrificial layer 812 may include a layer of oxide or nitride that is provided on source wafer 810. Sacrificial layer 812 may, for example, be a layer of native oxide on a source wafer 810 that is a silicon wafer. In other examples, sacrificial layer 812 is layer of oxide that is thermally grown on source wafer 810. In other examples, sacrificial layer 812 includes a layer of oxide or nitride that is deposited onto source wafer 810 (e.g., through physical vapor deposition, through chemical vapor deposition, through plasma-enhanced chemical vapor deposition).

Buffer layer 814 may be configured as a seed layer for growing a first piezoelectric layer 862$_1$. In some examples, buffer layer 814 may be configured to protect first piezoelectric layer 862$_1$ during a step of removing sacrificial layer 812 (e.g., an etch step during step (d), releasing piezoelectric actuator 860 from the source wafer 810, of FIG. 8). Buffer layer 814 may include one or more layers of material. In some examples, buffer layer is a bilayer of titanium oxide and platinum. Other materials that may act as seed layers for growth of a piezoelectric material and/or a barrier to protect piezoelectric layer 862$_1$ during an etch process are contemplated. Buffer layer 814 is optional, and its inclusion may depend on the material of piezoelectric layers 862 and/or the methods of removing sacrificial layer 812. Buffer layer 814 may be deposited by known methods such as physical vapor deposition, chemical vapor deposition, sputtering, evaporation (e.g., electron-beam evaporation, thermal evaporation), and/or other known methods of material deposition.

Step (d), depositing one or more piezoelectric layers 862 and one or more sets of electrodes 864 on source wafer 810, may include various configurations of piezoelectric layers 862 and electrodes 864. The method of FIG. 10 illustrates a method for fabricating a piezoelectric actuator 860 that may be an example of piezoelectric actuator 660 of FIG. 6A. That is, piezoelectric actuator 860 of FIG. 10 includes a plurality of piezoelectric elements 861 that are provided in a stacked configuration, with each piezoelectric element including a piezoelectric layer 862 and a set of interdigitated electrodes 864 that are coupled to a respective piezoelectric layer 862. The methods described herein may, however, be applied to fabricate other configurations of a piezoelectric actuator, such as piezoelectric actuator 760 of FIG. 7A, where the method may include alternative steps of depositing piezoelectric layers and planar electrodes. For example, step (d), depositing one or more piezoelectric layers 862 and one or more sets of electrodes 864, may also describe sets of electrodes that are planar electrodes and are deposited and disposed between adjacent piezoelectric layers 862 (e.g., piezoelectric actuator 760 of FIG. 7A, FIG. 7B, and/or FIG. 7C). Such examples are within the scope of the methods described herein.

Step (d), depositing one or more piezoelectric layers 862 and one or more sets of electrodes 864 on source wafer 810, includes the steps of (d1) depositing piezoelectric layer 862$_1$; and (d2) depositing electrodes 864$_1$ on piezoelectric layer 862$_1$. Piezoelectric layer 862$_1$ may be an example of piezoelectric layer 662$_1$ of FIG. 6A, FIG. 6B, and/or FIG. 6C. Piezoelectric layer 862$_1$ of FIG. 10 is deposited on buffer layer 814, such that buffer layer 814 is disposed between sacrificial layer 812 and piezoelectric layer 862$_1$. Electrodes 864$_1$ are interdigitated electrodes and may be an example of electrodes 464A and 464B of FIG. 4 and/or an example of electrodes 664A$_1$ and 664B$_1$ of FIG. 6A. In other examples, an electrode that is deposited on piezoelectric layer 862$_1$ may be a single planar electrode (e.g., as in the structure of piezoelectric actuator 760 of FIG. 7A).

Methods utilized for depositing a piezoelectric layer 862 may depend on the material that is used. For example, a piezoelectric layer 862 that includes PZT may be deposited by means that include solution coating (e.g., sol-gel, chemical solution deposition), sputtering, and/or pulsed laser deposition. A piezoelectric layer that includes a different piezoelectric material, such as a polymeric piezoelectric material, may be deposited using various solution casting techniques. Methods used for depositing an electrode 864 may include traditional means of metal deposition (e.g., sputtering, electron-beam evaporation) in combination with lithography in order to obtain a desired pattern of an electrode 864.

In step (d1) of FIG. 10, piezoelectric layer 862$_1$ is a first piezoelectric layer 862 of piezoelectric actuator 860. Step (d), depositing one or more piezoelectric layers 862 and one or more sets of electrodes 864 on source wafer 810, further includes the step of (d3) depositing one or more additional piezoelectric layers 862 and one or more additional electrodes 864 on each of the one or more additional piezoelectric layers 862. The deposition of each additional piezoelectric layer 862 is followed by the deposition of an additional one or more electrodes 864 such that a final structure of piezoelectric actuator 860 includes a stacked arrangement of alternating piezoelectric layers 862 and electrodes 864. Step (d3) of FIG. 10 includes the step of depositing a second piezoelectric layer 862$_2$ on first piezoelectric layer 862$_1$ and electrodes 864$_1$, and the step of depositing electrodes 864$_2$ on second piezoelectric layer 862$_2$.

Step (d3) of FIG. 10 may further include the step of depositing N additional piezoelectric layers 862 and N additional electrodes 864, with one of the N additional electrodes 864 deposited on each of the N additional piezoelectric layers 862. That is, the total number of piezoelectric layers 862 of piezoelectric actuator 860 is N+2. In the example of piezoelectric actuator 860 of FIG. 10, electrodes 864$_2$ and each of the N additional electrodes 864 are interdigitated electrodes. In other examples, electrodes that are deposited after piezoelectric layer 862$_2$ and each of the N additional piezoelectric layers 862 may be single planar electrodes.

Step (e), patterning the one or more piezoelectric layers 862 to segregate and define piezoelectric actuator 860, includes etching portions of piezoelectric layers 862 and, in some instances, buffer layer 814. In some examples, portions of sacrificial layer 812 are also etched. Various dry and wet chemical etch methods may be used to etch piezoelectric layers 862. In the example of a piezoelectric layer 862 that includes PZT, a wet etch process may include an acidic mixture of buffered HF and HCl. Other wet chemistries and methods of etching are contemplated and are within the scope of the methods described herein.

Step (e) results in a piezoelectric actuator 860 that has a defined shape and profile and is disposed on source wafer 810. Piezoelectric actuator 860 of FIG. 10 includes N+2 piezoelectric elements 861, wherein each piezoelectric element includes a piezoelectric layer 862 and electrodes 864. In the example of FIG. 10, piezoelectric actuator 860 includes N+2=3 piezoelectric elements 861$_1$, 861$_2$, and 861$_3$. Piezoelectric elements 861$_1$, 861$_2$, and 861$_3$ include piezoelectric layers 862$_1$, 862$_2$, and 862$_3$, respectively, and electrodes 864$_1$, 864$_2$, and 864$_3$, respectively. In other examples, piezoelectric actuator 860 may include more or fewer piezoelectric elements 861, dependent on how many additional piezoelectric layers 862 and additional electrodes 864 were deposited in step (d3) of FIG. 10.

Figure 11:
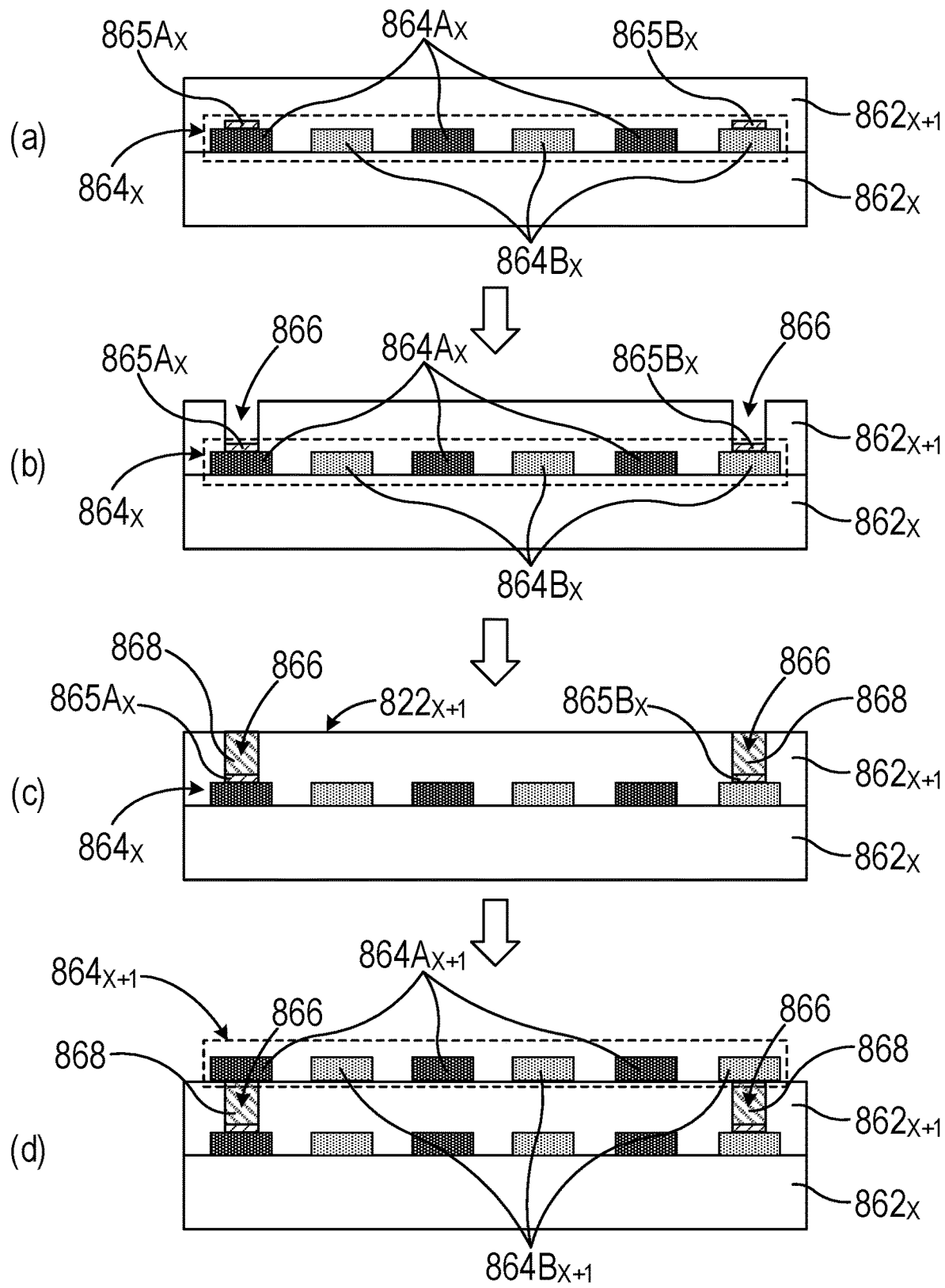
FIG. 11 is a diagram illustrating a method for fabricating a piezoelectric actuator on a source wafer, in accordance with aspects of this disclosure.

FIG. 11 is a diagram illustrating a method for fabricating a piezoelectric actuator on a source wafer, in accordance with aspects of this disclosure. The method illustrated in FIG. 11 may be included in step (d) of FIG. 10, depositing one or more piezoelectric layers 862 and one or more sets of electrodes 864 on source wafer 810. Specifically, the method of FIG. 11 describes a means of electrically coupling electrodes of piezoelectric actuator 860 that enables a voltage to be applied to two or more electrodes 864.

The method illustrated in FIG. 11 includes the steps of (a) providing a first piezoelectric layer 862$_X$ and first electrodes 864$_X$ that are coupled to first piezoelectric layer 862$_X$, and a second piezoelectric layer 862$_{X+1}$ that is deposited on first piezoelectric layer 862$_X$ and first electrodes 864$_X$ (e.g., from step (d) of FIG. 10); (b) patterning and etching vias 866 through second piezoelectric layer 862$_{X+1}$; (c) depositing an electrically conductive material 868 in each via 866; and (d) depositing second electrodes 864$_{X+1}$ on second piezoelectric layer 862$_{X+1}$.

First piezoelectric layer 862$_X$ and second piezoelectric layer 862$_{X+1}$ that are provided in step (a) may be examples of two piezoelectric layers 862 of step (d) of FIG. 10 (e.g., piezoelectric layer 862$_1$ and piezoelectric layer 862$_2$, piezoelectric layer 862$_2$ and piezoelectric layer 862$_{N+2}$). Electrodes 864$_X$ that are provided in step (a) may be an example of one of electrodes 864 (e.g., electrodes 864$_1$, 864$_2$, 864$_N$) of FIG. 10. Electrodes 864$_X$ include electrodes 864A$_X$ and electrodes 864B$_X$. Electrodes 864A$_X$ and electrodes 864B$_X$ of FIG. 11 are interdigitated electrodes and may each be an example of one of electrodes 664A$_N$ and 664B$_N$ of FIG. 6A, respectively.

Step (a) of FIG. 11 includes the step of providing pads 865A$_X$ and 865B$_X$ on electrodes 864A$_X$ and 864B$_X$, respectively. In some examples, pads 865A$_X$ and 865B$_X$ are included and configured as seed layers for step (c), depositing an electrically conductive material 868 in each via 866. Pads 865A$_X$ and 865B$_X$ may, in some examples, serve as etch stops for step (b), patterning and etching vias 866 through second piezoelectric layer 862$_{X+1}$. In the example of FIG. 11, pads 865A$_X$ and 865B$_X$ are provided at step (a). However, in other examples, pads 865A$_X$ and 865B$_X$ may be provided between steps (b) and (c). Pads 865A$_X$ and 865B$_X$ are optional and are not required for the methods of this disclosure. Their inclusion in the methods of this disclosure (e.g., the method illustrated in FIG. 11), is dependent of details such as material and process selection (e.g., the material and process for step (b) of FIG. 11).

Step (b), patterning and etching vias 866 through second piezoelectric layer 862$_{X+1}$, may be completed using a combination of lithography and various dry and wet chemical etch methods (e.g., chemical etch, ion-beam etch, reactive ion etch, inductively-coupled plasma etch). In the example of a second piezoelectric layer 862$_{X+1}$ that includes PZT, a wet etch process may include an acidic mixture of buffered HF and HCl. Other wet chemistries and methods of etching are contemplated and are within the scope of the methods described herein. In some examples, the step of etching vias 866 through second piezoelectric layer 862$_{X+1}$ includes the step of utilizing pads 865A$_X$ and 865B$_X$ or electrodes 864A$_X$ and 864B$_X$ as etch stops.

Electrically conductive material 868 may include gold, platinum, or other metals or metal alloys. Step (c), depositing an electrically conductive material 868 in each via 866, may be completed using various metal deposition processes. In some examples, step (c) includes the step of plating electrically conductive material 868 in each via 866. The step of plating electrically conductive material 868 may include the step of utilizing pads 865A$_X$ and 865B$_X$ (e.g., provided in step (a) or step (b)) as seed layers for electrically conductive material 868.

Step (c), may include the step of removing excess electrically conductive material 868 (e.g., overfill from plating) such that the electrically conductive material 868 that fills each via 866 terminates at a surface 822$_{X+1}$ of second piezoelectric layer 862$_{X+1}$. In some examples, the step of removing excess electrically conductive material 868 may utilize a timed dry etch or a chemical-mechanical polish (CMP) process.

Step (d) includes depositing second electrodes 864$_{X+1}$ on second piezoelectric layer 862$_{X+1}$ such that electrodes 864$_X$ and electrodes 864$_{X+1}$ are electrically coupled through each via 866. Specifically, electrode 864A$_{X+1}$ is electrically coupled to electrode 864A$_X$, and electrode 864B$_{X+1}$ is electrically coupled to electrode 864B$_X$. The electrical coupling enables a voltage to be applied to the two or more electrodes. For example, a voltage that is applied to electrode 864A$_{X+1}$ will be applied to both electrode 864A$_{X+1}$ and electrode 864A$_X$ due to electrical coupling through a via 866. A voltage that is applied to electrode 864B$_{X+1}$ will be applied to both electrode $864B_{X+1}$ and electrode $864B_X$ due to electrical coupling through a via 866.

In the method illustrated in FIG. 11, the step of (d) depositing second electrodes $864_{X+1}$ on second piezoelectric layer $862_{X+1}$ occurs after the steps of (b) patterning and etching vias 866 through second piezoelectric layer $862_{X+1}$ and (c) depositing an electrically conductive material 868 in each via 866. However, in some examples, second electrodes $864_{X+1}$ may be deposited after step (a). In such examples, step (b) may include the step of patterning and etching vias 866 through second piezoelectric layer $862_{X+1}$ and second electrodes $864_{X+1}$. Step (c) of such examples would still include depositing an electrically conductive material 868 in each via 866, however electrodes $864_X$ and $864_{X+1}$ would then be electrically coupled after step (c) rather than after step (d). Such examples are contemplated and are within the scope of the methods described herein.

The method illustrated in FIG. 11 may be repeated at each step of a method of depositing one or more piezoelectric layers 862 and one or more sets of electrodes 864 on a source wafer 810 (not illustrated). For example, the method illustrated in FIG. 11 may be completed after each step of depositing an additional piezoelectric layer 862 or additional electrodes 864 in step (d3) of FIG. 10. A result of completing the method illustrated in FIG. 11 after depositing each piezoelectric layer 862 or each electrode 864 may be electrical coupling between electrodes 864, enabling a voltage to be simultaneously applied to multiple electrodes 864. For example, the methods illustrated in FIG. 11 may enable a means of applying a voltage to multiple electrodes of piezoelectric actuator 660 of FIG. 6A (e.g., electrodes $664A_1$, $664A_2$, and $664A_{N+2}$; electrodes $664B_1$, $664B_2$, and $664B_{N+2}$). Additionally, while the method illustrated in FIG. 11 includes electrodes $864_X$ and $864_{X+1}$ that are interdigitated electrodes, it is contemplated that variations of the method illustrated in FIG. 11 may be used to electrically coupled two or more electrodes of an example piezoelectric actuator having planar electrodes (e.g., piezoelectric actuator 760 of FIG. 7A). Such examples are within the scope of the methods of this disclosure.

Figure 12:
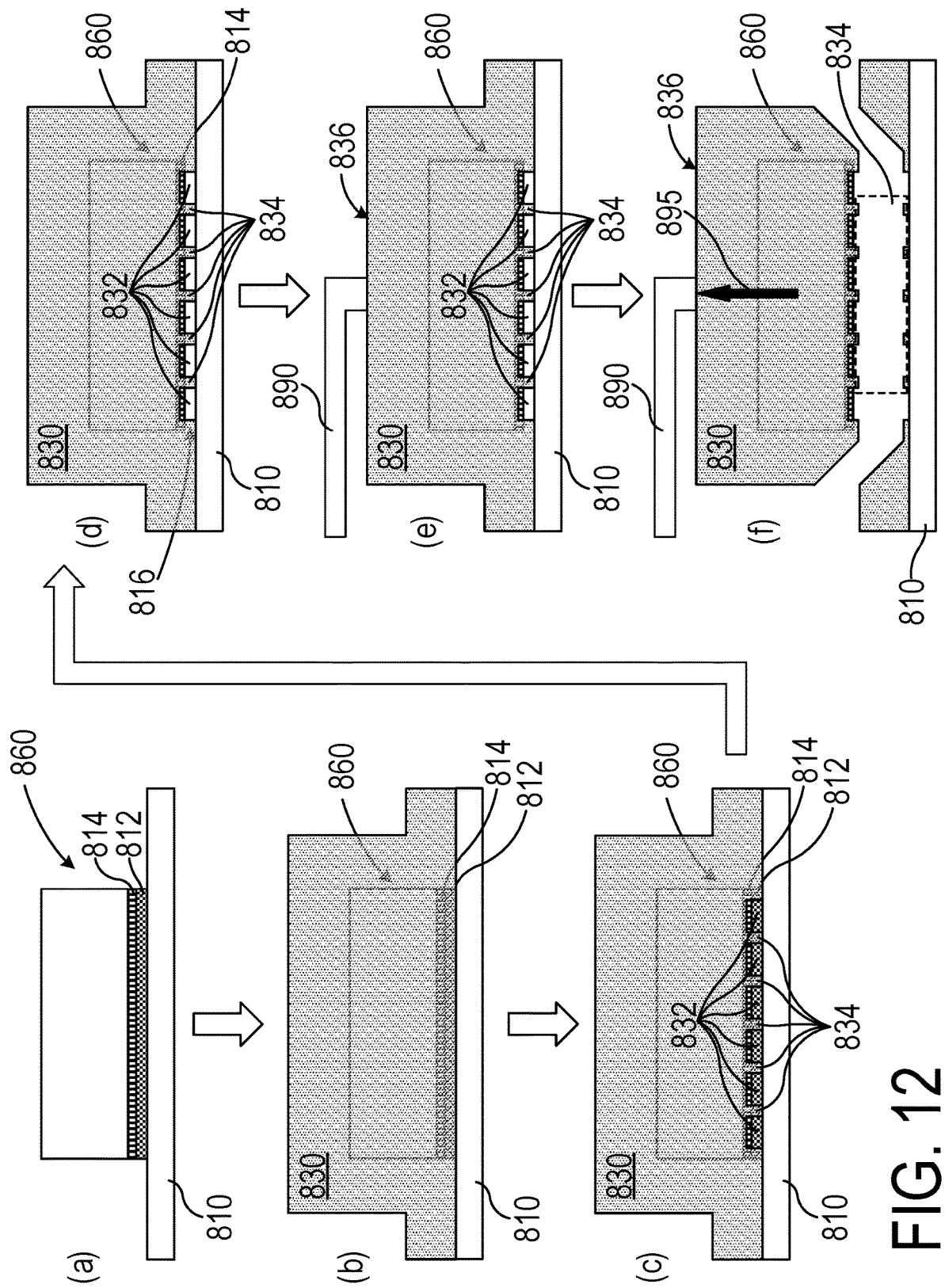
FIG. 12 is a diagram illustrating a method for releasing a piezoelectric actuator from a source wafer, in accordance with aspects of this disclosure.

FIG. 12 is a diagram illustrating a method for releasing a piezoelectric actuator from a source wafer, in accordance with aspects of this disclosure. The method illustrated in FIG. 12 illustrates one example of step (d) of FIG. 8, releasing piezoelectric actuator 860 from the source wafer 810. The method illustrated in FIG. 12 includes the steps of (a) providing a piezoelectric actuator 860 on a source wafer 810, wherein a sacrificial layer 812 is disposed between source wafer 810 and piezoelectric actuator 860; (b) depositing a tether layer 830 on piezoelectric actuator 860; (c) patterning tethers 834 in tether layer 830, the tethers 834 configured to bind the piezoelectric actuator to the source wafer after removing sacrificial layer 812; (d) removing sacrificial layer 812 with an etch process such that a gap 816 remains between piezoelectric actuator 860 and source wafer 810, and piezoelectric actuator 860 is bound to source wafer 810 by tethers 834; (e) contacting a surface 836 of tether layer 830 with a stamp 890 such that tether layer 830 becomes coupled to stamp 890; and (f) applying a force 895 to stamp 890 such that tethers 834 are broken and piezoelectric actuator 860 is lifted from source wafer 810.

Piezoelectric actuator 860 on source wafer 810 that is provided in step (a) of FIG. 12 may be an example of piezoelectric actuator 860 on source wafer 810 in step (e) of FIG. 10. Sacrificial layer 812 that is disposed between source wafer 810 and piezoelectric actuator 860 in step (a) of FIG. 12 may be an example of sacrificial layer 812 in step (e) of FIG. 10. A buffer layer 814 is disposed between sacrificial layer 812 and piezoelectric actuator 860 in the example of step (a) of FIG. 12. Buffer layer 814 may be an example of buffer layer 814 in step (e) of FIG. 10. Stamp 890 of steps (e) and (f) may be an example of stamp 890 in steps (d) and (e) of FIG. 8.

Tether layer 830 may be a layer of photoresist. In step (b), depositing a tether layer 830 on piezoelectric actuator 860, tether layer 830 may be deposited by various solution coating methods. Tether layer 830 in step (b) of FIG. 12 is deposited such that it covers piezoelectric actuator 860, buffer layer 814, and sacrificial layer 812, and covers a portion of source wafer 810.

Step (c), patterning tethers 834 in tether layer 830, may include a lithography process that includes the steps of producing windows 832 in tether layer 830. Windows 832 are arranged such that tethers 834 are formed between adjacent windows 832 in tether layer 830. Windows 832 are formed in tether layer 830 such that windows 832 expose portions of sacrificial layer 812 and, in some instances, portions of buffer layer 814. Tethers 834 of FIG. 12 are segments (e.g., pillars or blocks) of the material of tether layer 830 that remain after windows 832 are formed. Tethers 834 extend between tether layer 830 and source wafer 810. Adjacent windows 832 of windows 832 are each separated by a tether 834. In the example of FIG. 12, widths and spacing of tethers 834, and thus widths and spacing of windows 832, are substantially equidistant. However, other shapes and patterns of windows 832 and tethers 834 are contemplated.

Step (d), removing sacrificial layer 812 with an etch process such that a gap 816 remains between piezoelectric actuator 860 and source wafer 810, and piezoelectric actuator 860 is bound to source wafer 810 by tethers 834, may include removing sacrificial layer 812 with a wet etch process. For example, a buffered oxide etch or HF solution may be used to remove a sacrificial layer 812 that includes an oxide (e.g., a thermally grown oxide). In some examples, buffer layer 814 may protect layers of piezoelectric actuator 860 (e.g., a piezoelectric layer 862 of step (e) in FIG. 10) from chemicals that are used to etch sacrificial layer 812.

Step (e) includes a step of forming an adhesive bond between surface 836 of tether layer 830 and stamp 890. Step (e) may be an example of a step of contacting piezoelectric actuator 860 with stamp 890 such that piezoelectric actuator 860, still on source wafer 810, becomes coupled to stamp 890, in step (d) of FIG. 8. That is, step (d) of FIG. 8 may include contacting a tether layer that is disposed on piezoelectric actuator 860.

Step (f) includes breaking tethers 834 by applying a force to stamp 890, for example a force that lifts stamp 890 and piezoelectric actuator 860 from source wafer 810. That is, an adhesive force between stamp 890 and piezoelectric actuator 860 (e.g., tether layer 830 on piezoelectric actuator 860) may be stronger than tethers 834, such that a force applied to stamp 890 (e.g., a lifting force) breaks tethers 834 while piezoelectric actuator 860 remains coupled to stamp 890.

Figure 13:
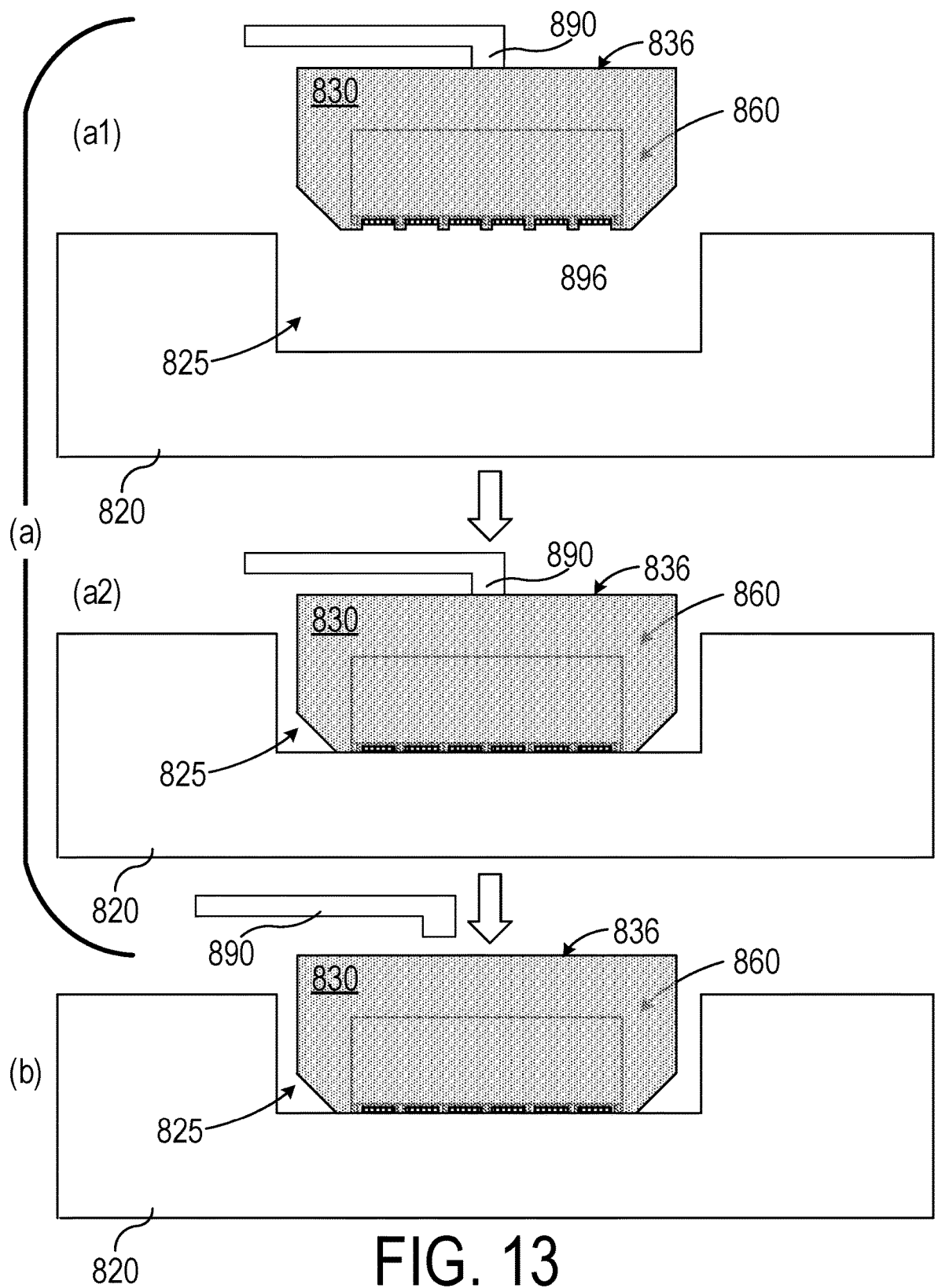
FIG. 13 is a diagram illustrating a method for placing a piezoelectric actuator on a target wafer, in accordance with aspects of this disclosure.

FIG. 13 is a diagram illustrating a method for placing a piezoelectric actuator on a target wafer, in accordance with aspects of this disclosure. The method illustrated in FIG. 13 illustrates one example of step (e), placing piezoelectric actuator 860 on target wafer 820, of FIG. 8. The method illustrated in FIG. 13 includes the steps of (a) placing, with a stamp 890, a piezoelectric actuator 860 on a target wafer 820; and (b) decoupling stamp 890 from a surface 836 of a tether layer 830 on piezoelectric actuator 860 such that piezoelectric actuator 860 becomes decoupled from stamp 890 and remains on target wafer 820.

Step (a) of FIG. 13 may be an example of step (e1) of FIG. 8. Step (a) of FIG. 13 includes the step of (a1) providing a tether layer 830 on a piezoelectric actuator 860, the tether layer 830 coupled to a stamp 890, and a target wafer 820. Tether layer 830, piezoelectric actuator 860, and stamp 890 may be examples of tether layer 830, piezoelectric actuator 860, and stamp 890 after step (f) of the method of FIG. 12 is completed. Stamp 890 of step (a) of FIG. 13 is coupled to a surface 836 of tether layer 830. Surface 836 of tether layer 830 of step (a) may be an example of surface 836 of tether layer 830 of step (f) of FIG. 12. Target wafer 820 may be an example of target wafer 820 of FIG. 8 or target wafer 820 of FIG. 9. Target wafer 820 includes a trench 825. Trench 825 of FIG. 13 may be an example of trench 825 of FIG. 8 or trench 825 of FIG. 9. Step (a) of FIG. 13 further includes the step of (a2) placing, with stamp 890, piezoelectric actuator 860 in trench 825.

Step (b) of FIG. 13 may be an example of step (e2) of FIG. 8. That is, step (b) of FIG. 13 may include a step of lifting stamp 890 from target wafer 820. Piezoelectric actuator 860 may remain adhered to target wafer 820 upon lifting stamp 890 from target wafer 820. The step of decoupling piezoelectric actuator 860 from stamp 890 may be enabled by providing a surface on target wafer 820 having a stronger adhesion to piezoelectric actuator 860 than adhesion between stamp 890 and piezoelectric actuator 860. In some examples, a layer of adhesive material (e.g., compliant layer 874 of FIG. 9) may enable adhesion between piezoelectric actuator 860 and target wafer 820, enabling piezoelectric actuator 860 to remain in trench 825 upon removing (e.g., peeling) stamp 890 from tether layer 830. Additionally, the step of lifting stamp 890 may include force components that are parallel to a surface of target wafer 820 (e.g., a surface that piezoelectric actuator 860 is adhered to). A combination of such shear forces with lifting forces may act to peel an adhesive material of stamp 890 from tether layer 830.

Figure 14:
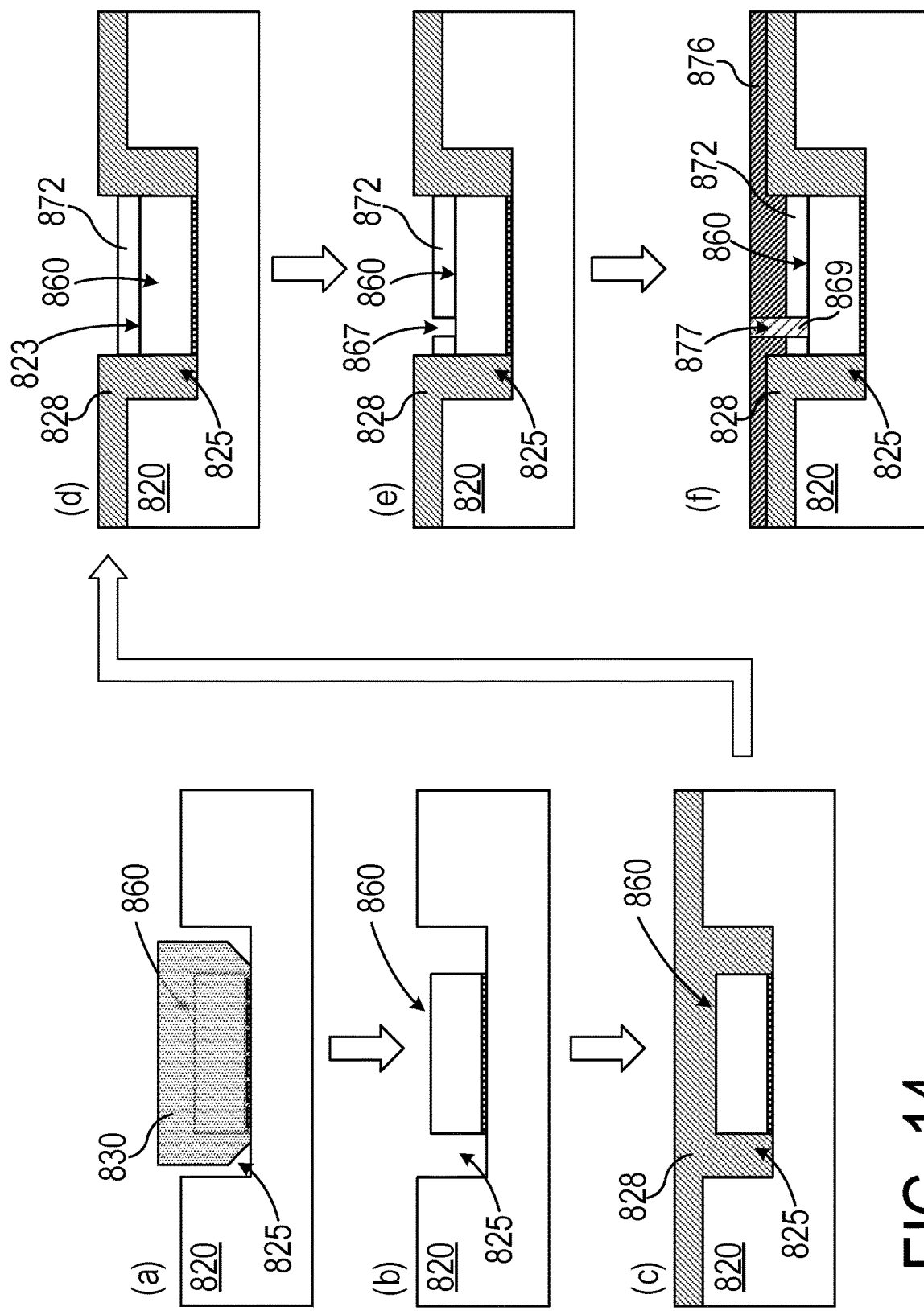
FIG. 14 is a diagram illustrating a method for processing a magnetic recording head that includes a piezoelectric actuator after transferring the piezoelectric actuator from a source wafer, in accordance with aspects of this disclosure.

FIG. 14 is a diagram illustrating a method for processing a magnetic recording head that includes a piezoelectric actuator after transferring the piezoelectric actuator from a source wafer, in accordance with aspects of this disclosure. The method illustrated in FIG. 14 illustrates one example of a method of processing that may occur after completing step (e), placing piezoelectric actuator 860 on target wafer 820, of FIG. 8. The method illustrated in FIG. 14 includes the steps of (a) providing a tether layer 830 on a piezoelectric actuator 860 that has been placed on a target wafer 820; (b) removing the tether layer 830 after placing piezoelectric actuator 860 on target wafer 820; (c) depositing an encapsulation layer 828 on piezoelectric actuator 860 after the step of (b) removing tether layer 830; (d) removing a portion of encapsulation layer 828 and depositing a layer 872 of a mechanically compliant material after the step of (b) removing tether layer 830; (e) etching a via 867 in layer 872; and (f) depositing an electrically conductive material 869 in via 867.

Tether layer 830, piezoelectric actuator 860, and target wafer 820 of step (a) may be examples of tether layer 830, piezoelectric actuator 860, and target wafer 820 of step (b) of the method illustrated in FIG. 13. Piezoelectric actuator 860 of FIG. 14 has been placed in a trench 825 on target wafer 820. Trench 825 may be a trench that has been etched in target wafer 820 (e.g., in step (b2) of FIG. 8, in step (b) of FIG. 9).

Step (b), removing the tether layer 830 after placing piezoelectric actuator 860 on target wafer 820, may include the step of removing tether layer 830 with an etch. The etch used to remove tether layer 830 may include a dry etch (e.g., reactive ion etch), a wet etch, or a combination of a wet and dry etch.

The step of depositing an encapsulation layer 828 on piezoelectric actuator 860 in step (c) of FIG. 14 may be accomplished with various deposition methods. In some examples, atomic layer deposition (ALD) may be used to deposit encapsulation layer 828. Utilizing ALD to deposit encapsulation layer 828 may enable encapsulation layer 828 to enclose outer surfaces of piezoelectric actuator 860 and fill gaps between piezoelectric actuator 860 and target wafer 820 (e.g., volume of trench 825 that is not occupied by piezoelectric actuator 860).

The step of (d) removing a portion of encapsulation layer 828 may be accomplished with various methods. For example, removing a portion of encapsulation layer 828 may be done using a dry etch. In other examples, removing a portion of encapsulation layer 828 may be completed with a CMP process. Removal of a portion of encapsulation layer 828 may, in some instances, terminate on piezoelectric actuator 860. That is, part of piezoelectric actuator 860 may be exposed after step (d). In the example of FIG. 14, a surface 823 of piezoelectric actuator 860 is exposed after removing a portion of encapsulation layer 828 in step (d). Surface 823 of piezoelectric actuator 860 may include an etch stop layer that was deposited at a previous processing step (e.g., after step (e) of FIG. 10).

Layer 872 that is deposited in step (d) may be an example of compliant layer 272 of FIG. 2 and/or compliant layer 372 of FIG. 3. In some examples, layer 872 may be deposited on piezoelectric actuator 860 (e.g., on surface 823). In other examples, layer 872 may be separated from piezoelectric actuator 860 (e.g., by a part of encapsulation layer 828).

The step of (e) etching a via 867 in layer 872 may be accomplished through a dry etch or other etch process. Via 867 may be positioned to align with an electrical contact of piezoelectric actuator 860, such as electrically conductive material 868 deposited in the method of FIG. 11.

Depositing an electrically conductive material 869 in via 867 in step (f) may be completed using various metal deposition processes. Electrically conductive material 869 may include gold, platinum, or other metals or metal alloys. In some examples, step (f) includes the step of plating electrically conductive material 869 in via 867. The step of plating electrically conductive material 867 may include the step of depositing a seed layer after etching via 867 in step (e) and before depositing electrically conductive material 869.

Layer 876 of step (f) may be an encapsulation layer, a buffer layer, a seed layer for another deposition, a layer of another feature of a magnetic recording head, or may serve another purpose. In some examples, layer 876 is a dielectric layer (e.g., an oxide, a nitride) and is deposited using ALD, chemical vapor deposition, physical vapor deposition, sputtering, or another method. Additional steps of step (f) may include steps of etching a via 877 in layer 876 and depositing additional electrically conductive material 869 to provide electrical contact to the electrically conductive material 869 that was deposited in via 867. Further processing after step (f) may include CMP of layer 876 prior to subsequent processing of a magnetic recording head.

The steps of the method illustrated in FIG. 14 are optional and are one example of steps that may be completed after a step of placing a piezoelectric actuator on a target wafer (e.g., step (e) of FIG. 9, the method illustrated in FIG. 13). Various steps may be omitted or completed in a different order while remaining within the scope of the methods described herein. Additionally, other methods are contemplated and may be included without limiting the methods described herein.

Various examples have been presented for the purposes of illustration and description. These and other examples are within the scope of the following claims.

What is claimed is:

1. A method for making a magnetic recording head, the magnetic recording head comprising a piezoelectric actuator for controlling head-media spacing, the method comprising the steps of:
   providing a source wafer on which to fabricate the piezoelectric actuator;
   providing a target wafer;
   fabricating the piezoelectric actuator on the source wafer;
   releasing the piezoelectric actuator from the source wafer; and
   placing the piezoelectric actuator on the target wafer.

2. The method of claim 1, wherein the target wafer is configured as a substrate for fabrication of the magnetic recording head.

3. The method of claim 1, wherein the target wafer comprises one or more features of the magnetic recording head.

4. The method of claim 1, further comprising the step of etching a trench in a surface of the target wafer, and wherein the step of placing the piezoelectric actuator on the target wafer comprises the step of placing the piezoelectric actuator in the trench.

5. The method of claim 4, wherein the step of etching a trench in a surface of the target wafer comprises etching a trench in proximity to a location of an active component of the magnetic recording head.

6. The method of claim 4, further comprising the step of depositing a layer of a mechanically compliant material along a base of the trench after the step of etching the trench and before the step of placing the piezoelectric actuator in the trench, such that the layer of mechanically compliant material is disposed between the base of the trench and the piezoelectric actuator after the step of placing the piezoelectric actuator in the trench.

7. A method for making a magnetic recording head, the magnetic recording head comprising a piezoelectric actuator for controlling head-media spacing, the method comprising the steps of:
   providing a source wafer on which to fabricate the piezoelectric actuator;
   providing a sacrificial layer on the source wafer;
   providing a target wafer;
   fabricating the piezoelectric actuator on the source wafer;
   depositing a tether layer on the piezoelectric actuator;
   patterning tethers in the tether layer, the tethers configured to bind the piezoelectric actuator to the source wafer after removing the sacrificial layer;
   removing the sacrificial layer with an etch process such that a gap remains between the piezoelectric actuator and the source wafer, and the piezoelectric actuator is bound to the source wafer by the tethers;
   contacting a surface of the tether layer with a stamp such that the tether layer becomes coupled to the stamp;
   applying a force to the stamp such that the tethers are broken and the piezoelectric actuator is lifted from the source wafer; and
   placing the piezoelectric actuator on the target wafer.

8. The method of claim 7, wherein the step of placing the piezoelectric actuator on the target wafer comprises the steps of:
   placing, with the stamp, the piezoelectric actuator on the target wafer; and
   decoupling the stamp from the surface of the tether layer such that the piezoelectric actuator becomes decoupled from the stamp and remains on the target wafer.

9. The method of claim 8, further comprising the step of etching a trench in a surface of the target wafer, and wherein the step of placing, with the stamp, the piezoelectric actuator on the target wafer comprises the step of placing, with the stamp, the piezoelectric actuator in the trench.

10. The method of claim 8, further comprising the step of removing the tether layer after placing the piezoelectric actuator on the target wafer.

11. The method of claim 10, further comprising the step of depositing an encapsulation layer on the piezoelectric actuator after the step of removing the tether layer, wherein the encapsulation layer encloses outer surfaces of the piezoelectric actuator.

12. The method of claim 11, further comprising the step of removing a portion of the encapsulation layer to expose a surface of the target wafer.

13. The method of claim 10, further comprising the step of depositing a layer of a mechanically compliant material after the step of removing the tether layer.

14. A method for making a magnetic recording head, the magnetic recording head comprising a piezoelectric actuator for controlling head-media spacing, the method comprising the steps of:
   providing a source wafer on which to fabricate the piezoelectric actuator;
   providing a target wafer;
   providing a sacrificial layer on the source wafer;
   depositing one or more piezoelectric layers and one or more electrodes on the source wafer;
   patterning the one or more piezoelectric layers to segregate and define the piezoelectric actuator;
   releasing the piezoelectric actuator from the source wafer; and
   placing the piezoelectric actuator on the target wafer.

15. The method of claim 14, wherein the step of depositing one or more piezoelectric layers and one or more electrodes on the source wafer comprises the steps of:
   depositing a piezoelectric layer; and
   depositing one or more electrodes on the piezoelectric layer.

16. The method of claim 15,
   wherein the piezoelectric layer is a first piezoelectric layer, and
   wherein the step of depositing one or more piezoelectric layers and one or more electrodes further comprises the step of depositing one or more additional piezoelectric layers and one or more additional electrodes on each of the one or more additional piezoelectric layers, a deposition of each additional piezoelectric layer followed by a deposition of an additional one or more electrodes such that a final structure of the piezoelectric actuator comprises a stacked arrangement of alternating piezoelectric layers and electrodes.

17. The method of claim 16, wherein the step of depositing one or more piezoelectric layers and one or more electrodes further comprises the steps of:
   patterning and etching vias through one or more additional piezoelectric layers; and depositing an electrically conductive material in each via such that two or more electrodes are electrically coupled through each via, the electrical coupling enabling a voltage to be applied to the two or more electrodes.

18. The method of claim 14, wherein the step of fabricating the piezoelectric actuator on the source wafer further comprises the step of depositing a buffer layer after providing the sacrificial layer on the source wafer and before depositing the one or more piezoelectric layers and the one or more electrodes, such that the buffer layer is disposed between the sacrificial layer and a piezoelectric layer of the one or more piezoelectric layers.

19. The method of claim 14, wherein the step of placing the piezoelectric actuator on the target wafer comprises the steps of:

placing, with a stamp, the piezoelectric actuator on the target wafer; and decoupling the stamp from a surface of the piezoelectric actuator such that the piezoelectric actuator becomes decoupled from the stamp and remains on the target wafer.

20. The method of claim 19, further comprising the step of etching a trench in a surface of the target wafer, and wherein the step of placing, with the stamp, the piezoelectric actuator on the target wafer comprises the step of placing, with the stamp, the piezoelectric actuator in the trench.

* * * * *